(12) United States Patent
Pialot et al.

(10) Patent No.: US 12,358,249 B2
(45) Date of Patent: Jul. 15, 2025

(54) SYSTEM FOR CUTTING STRIPS USING HELICAL KNIVES AND CORRESPONDING CUTTING METHOD

(71) Applicant: Compagnie Generale Des Etablissements Michelin, Clermont-Ferrand (FR)

(72) Inventors: Frederic Pialot, Clermont-Ferrand (FR); Christophe Bessac, Clermont-Ferrand (FR); Clement Dubois, Clermont-Ferrand (FR); Olivier Fuchs, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 939 days.

(21) Appl. No.: 17/293,275

(22) PCT Filed: Nov. 15, 2019

(86) PCT No.: PCT/FR2019/052723
§ 371 (c)(1),
(2) Date: May 12, 2021

(87) PCT Pub. No.: WO2020/099804
PCT Pub. Date: May 22, 2020

(65) Prior Publication Data
US 2022/0001635 A1   Jan. 6, 2022

(30) Foreign Application Priority Data

Nov. 16, 2018 (FR) ...................... 1860646

(51) Int. Cl.
*B26D 1/26* (2006.01)
*B26D 1/28* (2006.01)
(Continued)

(52) U.S. Cl.
CPC ............ *B29D 30/46* (2013.01); *B26D 1/265* (2013.01); *B26D 1/285* (2013.01); *B26D 3/003* (2013.01); *B29D 30/28* (2013.01); *B29D 30/3042* (2013.01)

(58) Field of Classification Search
CPC .... B29D 30/46; B29D 30/28; B29D 30/3042; B26D 1/265; B26D 1/285; B26D 3/003
See application file for complete search history.

(56) References Cited

U.S. PATENT DOCUMENTS

| | | | |
|---|---|---|---|
| 2,478,240 A * | 8/1949 | Christman | ........... B26D 7/2614 83/341 |
| 3,183,751 A | 5/1965 | Trevaskis | |

(Continued)

FOREIGN PATENT DOCUMENTS

GB          2190029 A     11/1987

*Primary Examiner* — Liang Dong
(74) *Attorney, Agent, or Firm* — Dickinson Wright PLLC

(57) ABSTRACT

The cutting system is configured to cut a continuous strip which extends lengthwise in a longitudinal direction and widthwise between a first edge and a second edge into strips. The cutting system includes a drive device which imparts to the continuous strip a feed speed, a first cutting roller and a contrarotating second cutting roller that cooperate to cut the continuous strip across its full width. The first cutting roller is provided with a first helical blade and is driven in rotation A variable synchronizer makes it possible to select and to modify the synchronization ratio between the rotational speed of the first cutting roller and the non-zero forward speed of the continuous strip in such a way as to be able to adjust the cutting angle according to which the cross-section of the continuous strip is oriented with respect to the longitudinal direction of the continuous strip.

19 Claims, 6 Drawing Sheets

(51) Int. Cl.
  *B26D 3/00* (2006.01)
  *B29D 30/28* (2006.01)
  *B29D 30/30* (2006.01)
  *B29D 30/46* (2006.01)

(56) References Cited

U.S. PATENT DOCUMENTS

| | | | | |
|---|---|---|---|---|
| 4,630,514 | A * | 12/1986 | Ohmori | B26D 1/405 |
| | | | | 83/342 |
| 5,000,812 | A * | 3/1991 | Murphy | B26D 1/626 |
| | | | | 83/342 |
| 2002/0184985 | A1 * | 12/2002 | Ishibuchi | B26D 7/2628 |
| | | | | 83/342 |
| 2006/0124226 | A1 * | 6/2006 | Gutknecht | B29D 30/3057 |
| | | | | 156/394.1 |
| 2006/0288827 | A1 * | 12/2006 | Ishibuchi | B26D 5/00 |
| | | | | 83/13 |
| 2008/0072724 | A1 * | 3/2008 | Ishibuchi | B26D 7/2614 |
| | | | | 83/342 |
| 2019/0077039 | A1 * | 3/2019 | Glass | B26D 7/1854 |

* cited by examiner

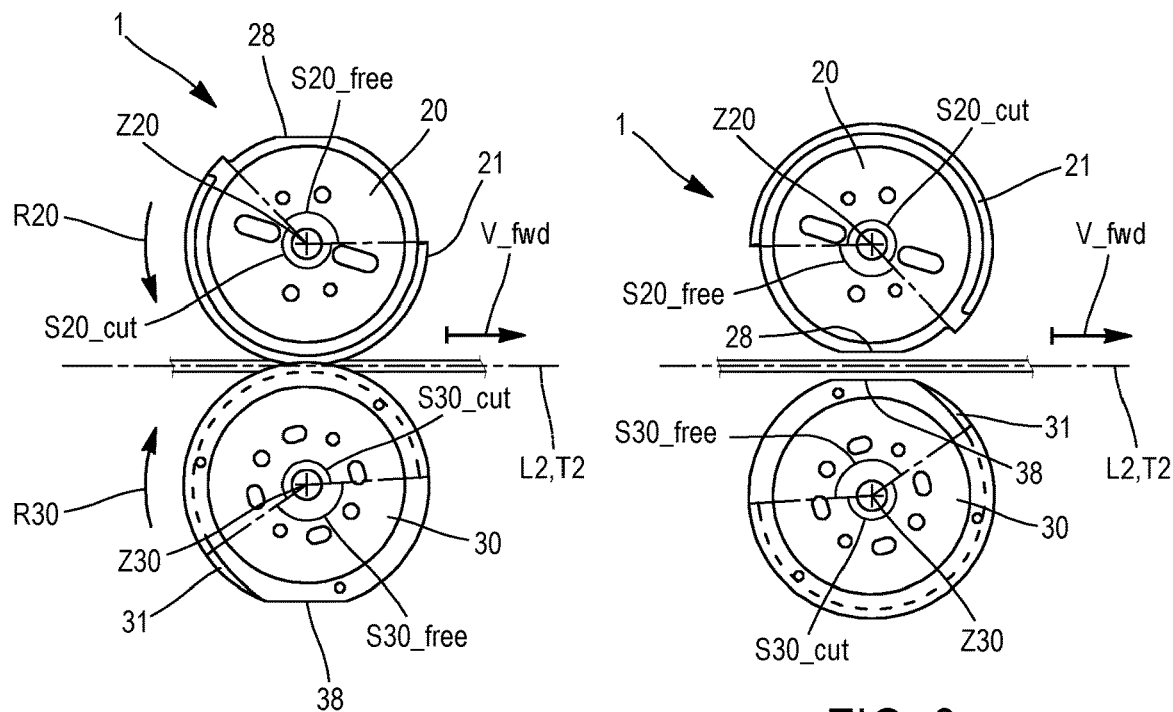
FIG. 7
FIG. 8
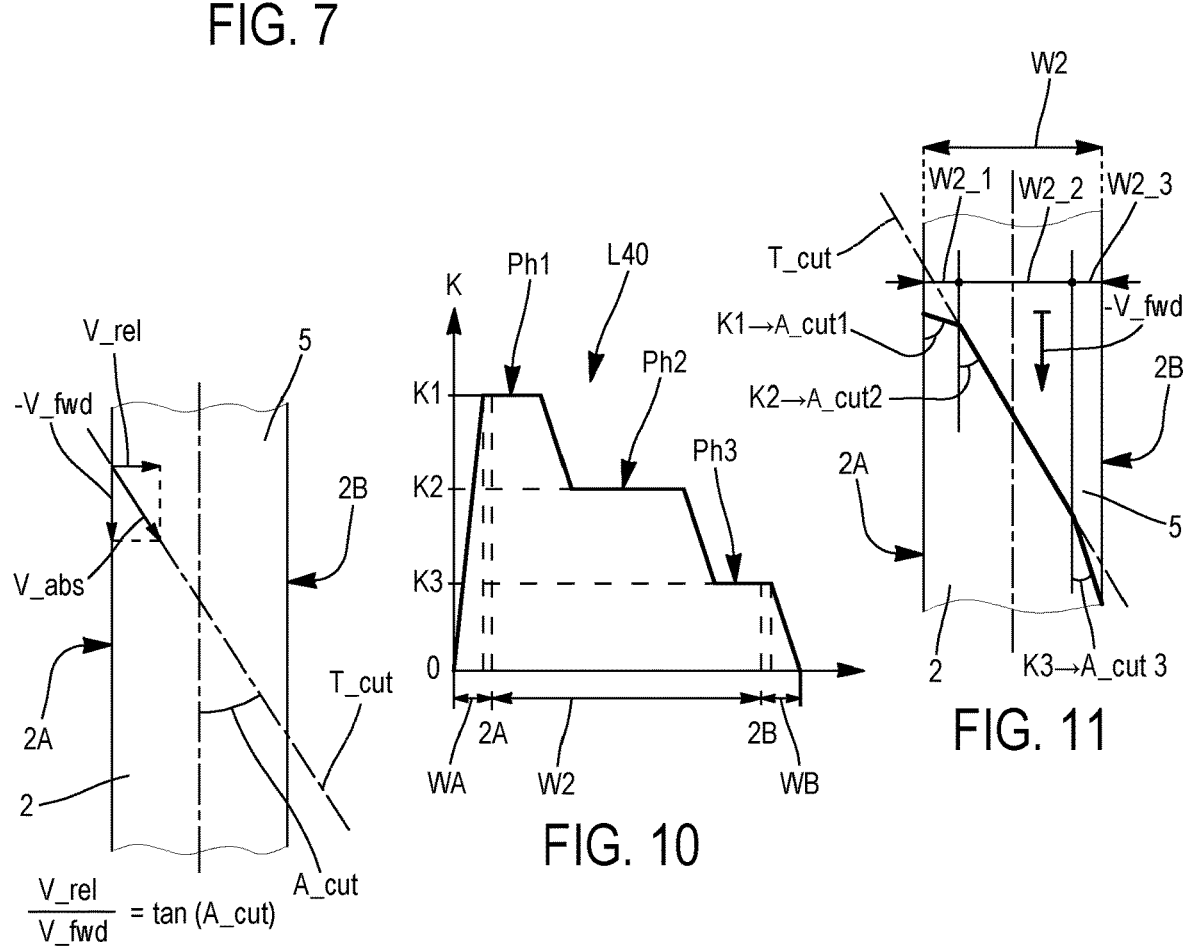
FIG. 9
FIG. 10
FIG. 11

SYSTEM FOR CUTTING STRIPS USING HELICAL KNIVES AND CORRESPONDING CUTTING METHOD

CROSS-REFERENCE TO RELATED APPLICATION

This application claims priority to and the benefit of PCT Patent Application No. PCT/FR2019/052723 filed on 15 Nov. 2019, entitled "SYSTEM FOR CUTTING STRIPS USING HELICAL KNIVES AND CORRESPONDING CUTTING METHOD," and French Patent Application No. 1860646, filed on 16 Nov. 2018, entitled "SYSTEM FOR CUTTING STRIPS USING HELICAL KNIVES AND CORRESPONDING CUTTING METHOD".

BACKGROUND

1. Field

The present disclosure concerns the field of preparation of strips by cutting an initially continuous strip and more particularly the application of strips prepared in this way to the fabrication of reinforcing plies for tires, in particular for pneumatic tires.

2. Related Art

Already known are numerous systems for fabrication of reinforcing plies in which the strips are cut and then placed successively edge to edge on an assembly support, such as a conveyor or a drum, so that the series of strips juxtaposed at their edges form the required reinforcement ply.

The strips are generally cut to length by means of a cutter having a guillotine type rectilinear blade that sections the continuous strip over all its width.

Cutters of this kind can sometimes prove relatively bulky because the blade has to cover all the width of the continuous strip, including for the production of bevel cuts.

Moreover, the use of a cutter of this kind necessitates stopping the advance of the continuous strip on each cut in order to prevent a traction force exerted on the strip when said strip is still partly attached to the continuous strip deforming said strip. Because of this the production throughput of the cutter can be relatively limited.

Moreover, cutters of this kind generally require relatively high cutting forces, consuming a great deal of energy.

Finally, for reasons of overall size as much as of mechanical feasibility, the ranges of cutting angle available to cutters of this kind can be relatively restricted.

SUMMARY OF THE INVENTION

The objects assigned to the disclosure therefore aim to remedy the drawbacks mentioned above and to propose a cutting system that makes it possible to produce sharp and precise cuts at a high rate of throughput, with low expenditure of energy, and that is multipurpose in that it offers a wide variety of choices of the cutting angle and easy reconfiguration to go from one cutting angle to the other.

The objects assigned to the disclosure are achieved by means of a cutting system for cutting a strip termed a "continuous strip" which extends lengthwise in a direction termed a "longitudinal direction" and widthwise between a first edge and a second edge, said cutting system being wherein it comprises:

a drive device adapted to drive the continuous strip along a strip path at a speed termed a "forward speed" that is oriented in the longitudinal direction of said continuous strip, a first cutting roller that is mounted so as to be able to be driven in a first movement in rotation at a chosen rotation speed about a first rotation axis oriented transversely to the strip path, preferably perpendicularly to said strip path, said first cutting roller being provided with a first helical blade that extends helically around said first rotation axis, a second cutting roller that is mounted to rotate about a second rotation axis preferably parallel to the first rotation axis in a second movement in rotation in the opposite direction to the movement in rotation of the first cutting roller and that is adapted to be able, when the continuous strip is engaged between said first and second cutting rollers, to cooperate with the first helical blade to cut said continuous strip over all the width of said continuous strip from the first edge to the second edge, a variable synchronizer which makes it possible to select and to modify the ratio termed the "synchronization ratio" between the rotation speed of the first cutting roller and the forward speed of the continuous strip in such a manner as to be able to adjust the angle termed the "cutting angle" at which the cut in the continuous strip is oriented relative to the longitudinal direction of said continuous strip.

The use of contrarotating cutting rollers advantageously enables a cut to be made over all the width of the continuous strip by means of compact helical cutting members the axial length of which barely exceeds the frontal width of the continuous strip.

Moreover, use of cutting rollers of this kind provided with a helical blade enables a cutting pressure to be exerted on a virtually point zone of the continuous strip that moves over the width of the continuous strip as the rollers rotate. It is therefore possible to exert on the continuous strip a very high shear stress and therefore to obtain easily a sharp cut, with a lower force to actuate the cutting rollers.

Then, and most importantly, thanks to the variable synchronizer the disclosure makes it possible to choose very freely the cutting angle at which the cutting line of the strip is oriented relative to the longitudinal direction of said strip, since said cutting angle is defined, in the plane of the strip, and at each moment concerned, by the orientation of a cutting speed vector that is the result of the vector sum of two components, namely the forward speed, in the longitudinal direction, and the cutting speed, in a direction transverse to said longitudinal direction, preferably perpendicular to said longitudinal direction, which components can be defined and controlled independently of one another by varying the synchronization ratio.

It is more advantageously possible to modify dynamically the synchronization ratio, and therefore the cutting angle, during the same cutting operation, between the first edge and the second edge of the continuous strip, and thus to adapt at any time the cutting conditions to confer in a very precise manner on the cutting line a predetermined shape, whatever that predetermined shape.

As will emerge hereinafter, such adjustment of the synchronization ratio can in particular make it possible to obtain a concave, rectilinear or convex cutting profile and/or to compensate the effects of deformation of the edges of the continuous strip to obtain a cutting line perfectly conforming to the required ideal geometrical line.

BRIEF DESCRIPTION OF THE DRAWINGS

Others objects, features and advantages of the disclosure will appear in more detail on reading the following description and from the appended drawings, provided by way of nonlimiting illustration only, in which:

FIG. 7 shows, in a side view, a pair of cutting rollers exerting a cutting action on a continuous strip.

FIG. 8 shows, in a side view, the cutting rollers from FIG. 7 in a configuration in which said rollers allow the continuous strip to pass without exerting any cutting action on the latter.

FIG. 9 shows, in a schematic view from above, the principle of adjustment of the cutting angle by selecting an appropriate synchronization ratio between the relative cutting speed, which results from the rotation speed of the first cutting roller, and the forward speed of the continuous strip.

FIG. 10 shows an example of a synchronization law in accordance with the disclosure, here comprising three successive constant value phases enabling successive application during the same widthwise cut of a plurality of different synchronization ratios, the absolute values which here decrease, for example to compensate the effects of deformation that is seen at the level of the edges of the continuous strip because of the cutting forces.

FIG. 11 shows, in a schematic view from above, a representation of the theoretical cutting angles corresponding to the synchronization ratios defined by the synchronization law from FIG. 10, together with a representation of the cutting line actually obtained by applying that series of synchronization ratios to a continuous strip the edges of which are subject to deformation phenomena.

DETAILED DESCRIPTION OF THE ENABLING EMBODIMENT

The present disclosure concerns a cutting system 1 intended to cut a strip 2 termed a "continuous strip" 2.

Said continuous strip 2 extends lengthwise in a direction termed the "longitudinal direction" L2 and widthwise W2 between a first edge 2A and a second edge 2B.

Figure 3:
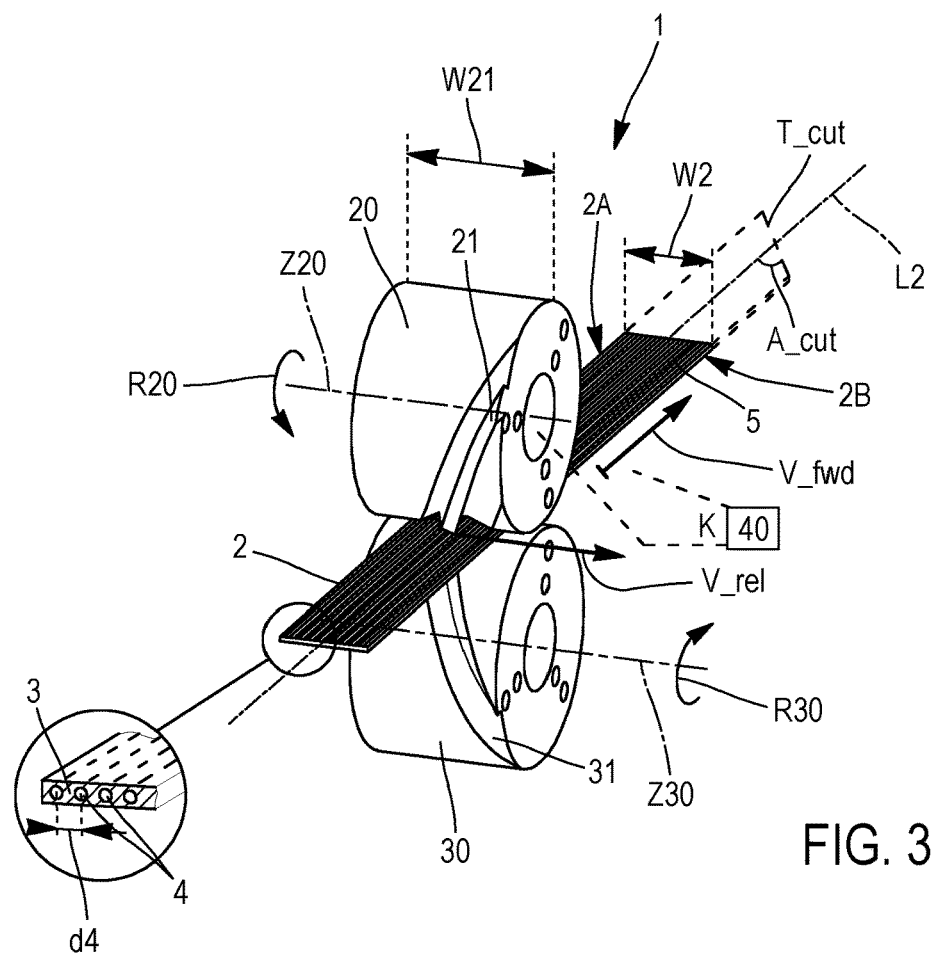
FIG. 3 shows, in a perspective view, the application of the cutting rollers from FIGS. 1 and 2 to an operation of cutting a continuous strip on the fly.

As can be seen in FIG. 3, said continuous strip 2 will preferably constitute a "zero degree belt" that is formed of at least one rubber layer 3 reinforced by a plurality of continuous, preferably metal, reinforcing cords 4 that extend parallel to one another in the longitudinal direction L2 of the continuous strip 2.

The reinforcing cords 4 could be multistranded, that is to say each formed of an assembly of interlaced strands, or preferably single-stranded, that is to say each formed by only one one-piece strand.

The reinforcing cords 4 could be made of any material less sensitive to extension than the rubber layer 3. Thus said reinforcing cords 4 could preferably be made of metal, or where appropriate a composite material combining metal fibers with fibers made of at least one other material, such as for example glass fibers or aramid fibers.

The zero degree belt may be obtained by any appropriate method, such as calendering or extrusion.

The cutting system 1 is adapted in such a manner as to be able to section the continuous strip 2 transversely to the longitudinal direction L2 over all the width W2 of said continuous strip 2 between the first edge 2A and the second edge 2B inclusive, in order to subdivide said continuous strip 2 into strips 5 having a predetermined length that is less than the initial length of the continuous strip 2.

In this regard, it will be noted that the cutting system 1 in accordance with the disclosure is preferably designed, in particular as to the hardness of the cutting members that it utilizes and as to the cutting pressure that it is able to exert on the continuous strip 2, in such a manner as to be able to section the reinforcing cords 4, in particular the metal reinforcing cords 4, that are distributed across the width W2 of the continuous strip 2.

Figure 17:
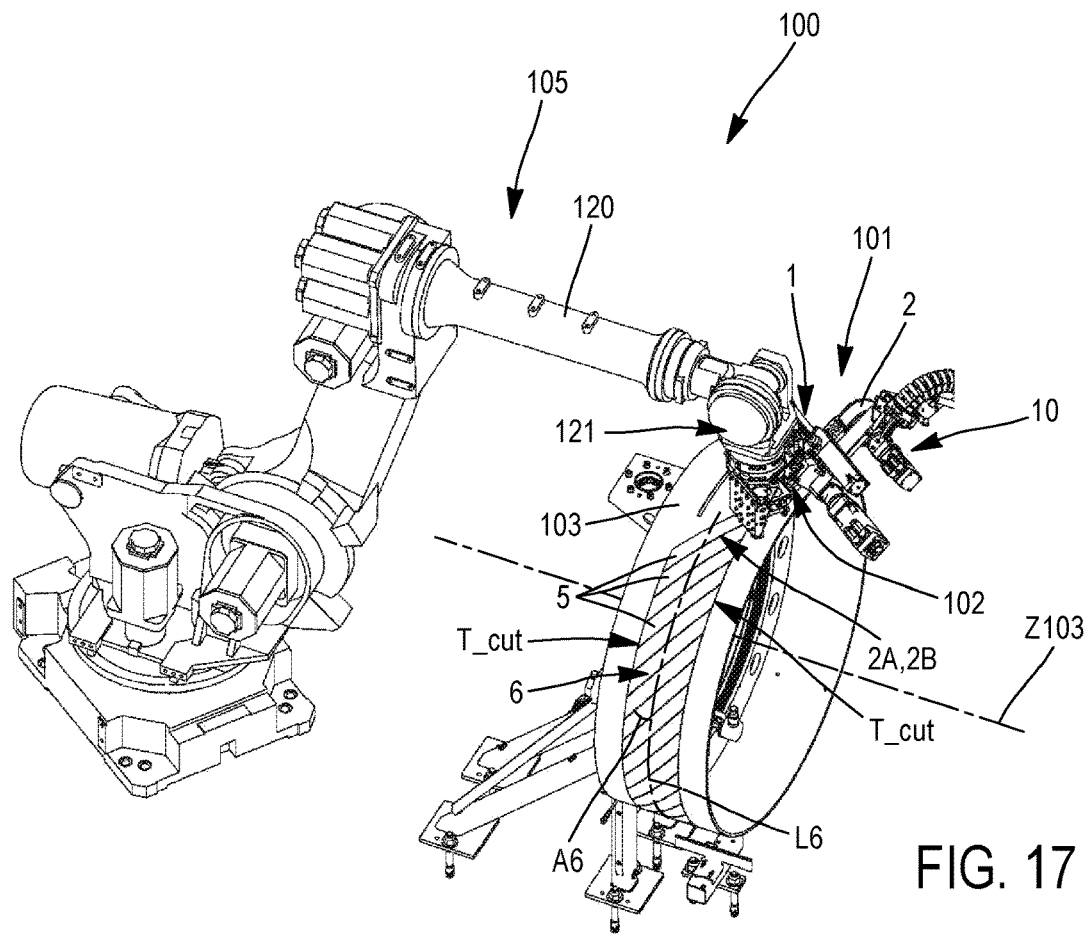
FIG. 17 shows, in a perspective view, another example of a reinforcement ply fabrication installation this time using an anthropomorphic robot arm, for example a six-axis robot arm, the terminal member of which forming a wrist is this time connected to the base by a single kinematic chain and said wrist of which bears an applicator head associated with a cutting system in accordance with the disclosure.

As is shown in FIG. 17 in particular, the strips 5, in particular the strips 5 resulting from cutting a zero degree belt type reinforced continuous strip 2, could for example be used to constitute a reinforcement ply 6 intended for example to reinforce the crown of a tire, such as a pneumatic tire, and in particular intended to be part of the composition of a radial pneumatic tire architecture.

It will be noted that the strips 5, abutted to one another at their edges 2A, 2B to form the reinforcement ply 6, are preferably disposed obliquely relative to the longitudinal direction L6 of said reinforcement ply in such a manner that the reinforcing cords 4 present in the strips form a non-zero angle, termed the "ply angle" A6, relative to the longitudinal direction L6 of the ply, as can be seen in FIG. 17 in particular.

The term "cutting angle" A_cut denotes the angle that the cutting line T_cut of the strip 5 forms at the point concerned of said cutting line T_cut relative to the longitudinal direction L2.

In practice, the cutting angle A_cut is chosen as a function of the target ply angle A6 and may preferably be substantially or even exactly equal to said target ply angle A6.

In accordance with the disclosure, the cutting system 1 comprises a drive device 10 that is adapted to drive the continuous strip 2 along a strip path T2 at a speed termed the "forward speed" V_fwd.

Said forward speed V_fwd is oriented in the longitudinal direction L2 of said continuous strip 2.

The drive device 10 could for example comprise one or more motorized drive rollers 11 for moving the continuous strip 2, preferably by friction.

The drive device 10 will preferably be driven by an electric motor placed under the control of a controller that will apply to said electric motor the appropriate set point to obtain the required forward speed V_fwd.

The cutting system 1 then comprises a first cutting roller 20 that is mounted so as to be able to be driven in a first movement in rotation R20 at a chosen rotation speed R20 about a first rotation axis Z20 that is oriented transversely to the strip path T2, preferably perpendicularly to said strip path T2.

The first rotation axis Z20 corresponds in practice to the central axis of the first cutting roller 20, which preferably has a substantially cylindrical shape with a circular base centered on said axis Z20.

For convenience of description there could be assimilated under the same reference R20 the movement in rotation R20 of the first cutting roller 20 and the rotation speed R20 at which said rotation movement is effected.

As can be seen in FIGS. 1 to 8 and 15 in particular, the first cutting roller 20 is provided with a first helical blade 21 that extends helically around the first rotation axis Z20.

By virtue of its lead screw shape, the first helical blade 21 advantageously constitutes a compact means of producing a cut in the continuous strip 2 over all the width W2 of said continuous strip, and this regardless of the cutting angle A_cut envisaged, as will emerge hereinafter.

In this regard, the first helical blade 21 preferably extends helically around the first rotation axis Z20 over a distance W21 along the first rotation axis Z20 and termed the "usable blade width" W21, which is sufficient to enable said first blade 21 to cross and to cut all the width W2 of the continuous strip 2, from the first edge 2A to the second edge 2B, and which is therefore at least equal to, and preferably strictly greater than, the width W2.

Thus here W21>W2.

The first helical blade 21 will more preferably project axially on each side of the bandwidth W2 by a lateral clearance value WA, WB.

Each clearance value A, WB will preferably be between 2 mm and 5 mm inclusive, or even 10 mm inclusive, so that:

$$W2+4 \text{ mm} \leq W21 \leq W2+10 \text{ mm}$$

or even:

$$W2+4 \text{ mm} \leq W21 \leq W2+20 \text{ mm}$$

The first blade 21 preferably protrudes radially relative to the cylindrical surface of the first cutting roller 20 against which the continuous strip 2 comes to bear during cutting. The first cutting member 20 therefore forms a "male" cutting member.

By convention in the description, the first blade 21, and more generally the cutting to system 1, will preferably be considered to begin cutting at the first edge 2A, termed the "leading edge", and to terminate the cut at the second edge 2B, termed the "trailing edge".

This being so, as it advances over the width W2 of the continuous strip 2, the first blade 21 of course severs the various reinforcing cords that are situated between said first edge 2A and second edge 2B and which therefore cross the cutting line T_cut.

The cutting system 1 also comprises a second cutting roller 30 that is mounted to rotate about a second rotation axis Z30 preferably parallel to the first rotation axis Z20 in a second movement in rotation R30 in the opposite direction to the movement in rotation R20 of the first cutting roller 20.

Said second cutting roller 30 is adapted to be able, when the continuous strip 2 is engaged between the first and second cutting rollers 20, 30, to cooperate with the first helical blade 21 to cut the continuous strip 2 over all the width W2 of said continuous strip 2 from the first edge 2A to the second edge 2B.

R30 will denote the rotation speed of the second cutting roller 30, here again by assimilating the movement in rotation and the rotation speed of the second roller 30 under the same reference R30.

The use of contrarotating cutting rollers 20, 30 with helical cutting members advantageously enables a sharp cut to be produced in the continuous strip 2 "on the fly" when the latter is moving at a non-zero forward speed V_fwd.

The cutting rollers 20, 30 will preferably and advantageously turn in the same direction as the forward speed V_fwd of the continuous strip 2 in order to accompany the movement of said continuous strip 2 at least during the cutting operation.

The cutting rollers 20, 30 will preferably be driven by an electric motor.

Different variant geometrical shapes may of course be envisaged for the cutting members of the cutting rollers 20, 30.

As is shown in FIGS. 1, 2, 3, 5, 7, 8, 12, 13, 14 and 15 in particular, in accordance with one preferred arrangement possibility the second cutting roller 30 features a helical groove 31 of conjugate shape to the first blade 21.

Said helical groove 31 will be arranged radially and recessed relative to the cylindrical surface of the second roller 30 on which the continuous strip 2 comes to bear during cutting.

In accordance with an arrangement of that kind, the blade 21 forms a male cutting member and the helical groove 31 forms a female cutting member.

By means of cutting members 21, 31 that have relatively simple shapes an arrangement of the above kind makes it possible to obtain effective shearing of the continuous strip 2 between the first blade 21 and the groove 31 in the direction of the thickness of said continuous strip 2.

Like the helical blade 21, the helical groove 31 will preferably extend along the second rotation axis Z30 over a distance sufficient to cover at least the width W2 of the continuous strip 2 and more preferably over a distance equal to or at least equal to the distance W21 occupied by the first helical blade 21.

Figures 4, 5, 6:
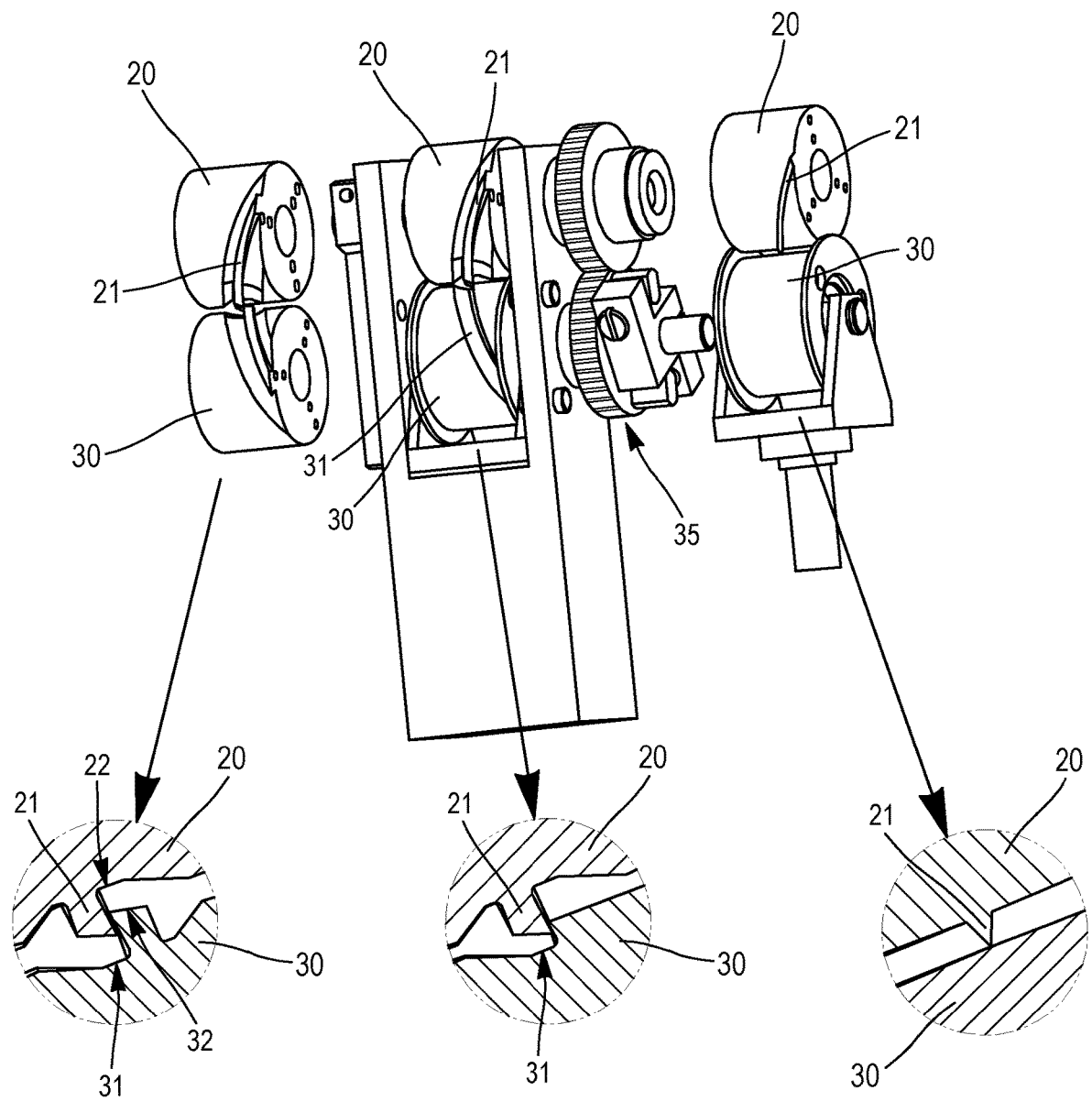
FIGS. 4, 5 and 6 show, in perspective views, diverse forms of cutting members, in particular comprising helical blades, and more generally show diverse examples of conjugate cutting roller pairs usable in a cutting system in accordance with the disclosure.

Any other variant arrangement of the cutting members could of course be envisaged, for example a double-blade variant, as represented in FIG. 4, in which each cutting roller 20, 30 has both a protruding helical blade 21, 32 and a re-entrant helical groove 22, 31 adapted to receive the helical blade of the other cutting roller.

In another variant, represented in FIG. 6, the second cutting roller 30 has a surface with no relief conjugate with the helical blade 21 of the first cutting roller 20, that is to say with no helical groove, and thus forms an anvil on which the cutting edge of said helical blade 21 comes to bear flat.

However, the variants utilizing protruding blade/reentrant groove type reliefs will be preferred because of the efficacy of the resulting cutting edges.

Of course, a non-zero radial interference will be provided between the cutting rollers 20, 30, that is to say a non-zero depth to which the first blade 21 penetrates into the helical groove 31 or, where appropriate, a non-zero height over which the first blade 21 and the second blade 32 overlap radially, so as to be able shear the continuous strip 2 effectively, throughout its thickness, with said blade 21 or said blades 21, 32. Where necessary, said radial interference could be slightly greater than the thickness of the continuous strip 2 to be cut.

This radial interference will preferably be between 1 mm and 2 mm inclusive.

A radial interference value of the order of 1 mm will in particular be very suitable for continuous strips 2 having a thickness of 0.8 mm.

The distance between the first and second rotation axes Z20, Z30 will be adjusted accordingly.

For convenience of description, "cutting members" could designate the blade or blades 21, 32 and/or the helical groove or grooves 31, 22 conjugate therewith that enable the cutting rollers 20, 30 to exert their cutting action on the continuous strip 2.

An axial clearance control system could moreover preferably be provided to enable:
either automatic elimination of the axial clearance between the first cutting roller 20 and the second cutting roller 30, for example by means of a spring acting axially on one of said cutting rollers, so as to press the blade 21 axially against the helical groove 31 and therefore to have a zero axial clearance during cutting,
or, in accordance with a variant that may constitute an invention in its own right, adjusting a predetermined non-zero fixed axial clearance between the blade 21 and the helical groove 31, for example a clearance strictly greater than 0 mm and less than or equal to 1.5 mm. The inventors have in fact found that a fixed clearance of this kind could make it possible to obtain cuts of different quality on some types of continuous strips 2, in particular continuous strips with single-strand reinforcing cords 4. The axial clearance could for example be adjusted by means of one or more adjustable stops, such as screw stops, that will enable precise positioning of the cutting rollers 20, 30 relative to one another along their respective rotation axes Z20, Z30.

In particular, for reasons of compactness and simplicity of control, the first cutting roller 20 and the second cutting roller 30, which are disposed on respective opposite sides of the strip path T2 which passes between said cutting rollers 20, 30, will preferably be oriented so that their rotation axed Z20, Z30 are perpendicular to the longitudinal direction L2 of the continuous strip 2 and substantially or even exactly parallel to the surfaces of said continuous strip 2 that come to bear against said cutting rollers 20, 30.

Moreover, said first and second cutting rollers 20, 30 will preferably be driven synchronously, that is to say that the absolute value of the rotation speed R30 of the second cutting roller 30 will preferably be equal to the absolute value of the rotation speed R20 of the first cutting roller 20, although these two speeds are of opposite sign. Thus:

$$R30 = -R20$$

Synchronism, preferably permanent synchronism, of this kind will advantageously make it possible to obtain a cut without slippage and to guarantee fluid movement without deleterious interference of the conjugate helical shapes of the cutting members consisting of the blade or blades 21, 32 and the conjugate groove or grooves 31, 22.

The synchronism between the first and second cutting rollers 20, 30 could be obtained directly for example by means of gears 35, as is shown in FIG. 5.

In accordance with the disclosure, the cutting system 1 advantageously further comprises a variable synchronizer 40 that makes it possible to select and to modify the ratio, termed the "synchronization ratio" K, between the rotation speed R20 of the first cutting roller and the preferably non-zero forward speed V_fwd of the continuous strip 2 in such a manner as to be able to adjust the angle termed the "cutting angle" A_cut at which the cutting of the continuous strip 2 is oriented relative to the longitudinal direction L2 of said continuous strip 2.

In practice the variable synchronizer 40 therefore makes it possible, by means of a synchronization ratio K of chosen and modifiable value, to link the rotation speed R20 of the first cutting roller 20 (and consequently the rotation speed R30 of the second cutting roller 30) to the forward speed V_fwd that is conferred upon the continuous strip 2 by the drive device 10, regardless of said forward speed V_fwd, and in particular regardless of the non-zero forward speed V_fwd:

$$R20 = K * V\_fwd$$

As shown in FIG. 9, the variable synchronizer 40 therefore enables selection and modification of the ratio
on the one hand between the speed termed the "relative cutting speed" V_rel, transverse to the longitudinal direction L2 of the continuous strip, of the tip of the first cutting roller 20, here the tip of the first helical blade 21, that is interengaged with the continuous strip 2 at the moment concerned during the cutting operation; this linear relative cutting speed V_rel is here the result of the rotation speed R20 of the first cutting roller 20, in this instance in accordance with a proportional conversion coefficient c1 that depends on the pitch of the first helical blade 21: V_rel=c1*R20; and
on the other hand at least one non-zero forward speed V_fwd,
in such a manner as to be able to adjust the angle termed the "cutting angle" A_cut by which, at the time concerned, the direction in which the continuous strip 2 is cut relative to the longitudinal direction L2 of said continuous strip.

In fact, more generally, and whatever the nature of the cutting tool used (cutting roller 20 with helical blade, or even some other localized cutting means such as a water jet or laser), the synchronization ratio K makes it possible to define, in the plane of the continuous strip 2, the relationship between the two components V_fwd, V_rel of a resultant cutting vector V_abs that defines the director vector of the cutting line T_cut at the time concerned.

Those two components are on the one hand the longitudinal forward speed V_fwd (in the longitudinal direction L2) and on the other hand the relative cutting speed V_rel that corresponds to the movement of the cutting tip transversely, here perpendicularly, to the longitudinal direction L2.

Here, having chosen and knowing the forward speed V_fwd, which could be considered the "master" value, it will be possible to regulate the rotation speed R20 of the first cutting roller 20, considered the "slave" value, simply by applying the following formula: R20=K*V_fwd.

This will result in a linear relative cutting speed V_rel:

$$V\_rel = c1 * R20 = c1 * K * V\_fwd.$$

As can be seen in FIG. 9, because of the composition of the speeds as controlled by means of the synchronization ratio K, at each point on the cutting line T_cut:

$$A\_cut = \mathrm{Arc}\tan(V\_rel/V\_fwd) = \mathrm{Arc}\tan(c1 * K)$$

The resulting cutting vector V_abs will therefore have the components:
V_abs (V_fwd, V_rel)
thus V_abs (V_fwd, c1*R20)
thus V_abs (V_fwd, c1*K*V_fwd)

It will be noted that, merely for convenience of representation, inasmuch as the forward speed V_fwd represents the speed of movement of the continuous strip 2 relative to the position of the cutting rollers 20, 30, there has with total rigour been considered in FIG. 9 a longitudinal speed component −V_fwd that has the opposite value to the forward speed V_fwd and therefore corresponds to the imaginary longitudinal speed component of the cutting tip of the first blade 21 and more generally to the longitudinal speed component of the cutting tip relative to the continuous strip 2 defined by the cutting members of the first and second cutting rollers 20.

Of course, the actual value of the forward speed V_fwd, and likewise the actual value of the rotation speed R20 of the first cutting roller 20, could preferably be evaluated or measured by any measurement system or any appropriate sensor functionally connected to the variable synchronizer 40.

In any event, the disclosure will advantageously make it possible to choose the synchronization ratio K from a plurality of possible values, and preferably in a continuous manner in accordance with any value included in a range of predetermined values.

Because of this, it will be possible to choose and to modify the cutting angle A_cut within a predetermined range without having to modify the cutting rollers 20, 30 themselves or more generally the hardware configuration of the cutting system 1.

With the same set of cutting rollers 20, 30 and simply by adapting the synchronization ratio K it will typically and preferably be possible to adjust, and in particular to improve the absolute value of, the cutting angle A_cut over a range of at least 10 degrees, or even 15 degrees, relative to a reference value that corresponds to the minimum absolute value of the cutting angle A_cut that can be obtained with the helical blade 21 of the set of cutting rollers 20, 30 concerned.

In practice, this reference value depends in particular on the helix angle of the first helical blade 21 considered relative to the rotation axis Z20 of the first roller 20 bearing said first helical blade 21. In particular, said reference value could be substantially equal, for example to within +/1 degrees, to the value of the helix angle of said helical blade 21.

By way of example, with one and the same geometrical arrangement of the cutting rollers 20, 30, in which the helix angle of the helical blade 21, respectively of the helical groove 31, was 24.2 degrees, the inventors have been able, by alone adapting the synchronization ratio K, to section a continuous strip 2 of width W2=45 mm at cutting angles freely chosen in a range between 25 degrees and 38 degrees inclusive.

It will also be noted that the disclosure is equally applicable when the forward speed V_fwd is constant and, alternatively, when the forward speed V_fwd varies over time.

In particular, the disclosure makes it possible if necessary to adapt the rotation speed R20 of the first cutting roller 20 in real time during the cutting operation and in accordance with the synchronization ratio K applicable at the time concerned, to compensate fluctuations to which the forward speed V_fwd is subjected or on which it is imposed that occur during said cutting operation.

Such variations of the forward speed V_fwd may for example be commanded during the operation of applying the strip 5 to adapt said forward speed V_fwd to the speed at which the strip 5 being cut is placed on an assembly support 103, in particular if it is necessary to vary the application speed to adapt it to a particular shape of the assembly support 103, for example a convex shape.

If the synchronization ratio K applicable over a given period of the cutting operation is constant the synchronizer 40 will advantageously vary the rotation speed R20 of the first cutting roller 20 as an (inversely proportional) function of the variations of the forward speed V_fwd so as to maintain a constant ratio K between those speeds R20, V_fwd.

In practice, the forward speed V_fwd during the cutting operation, whether constant or variable, could preferably be equal to or greater than 0.5 m/s, or even 0.7 m/s.

During the cutting operation, the forward speed V_fwd could moreover preferably be less than or equal to 2 m/s, or even 1.5 m/s.

By way of preferred example, during the cutting operation the forward speed V_fwd, whether constant or variable, could be between 0.7 m/s and 1.2 m/s inclusive.

Moreover, the disclosure makes it possible to adjust and to vary the synchronization ratio K as required in real time during the cutting operation.

For convenience of control, the synchronization ratio K could preferably be modified while maintaining a constant forward speed V_fwd.

This being the case, there is nothing to rule out intentionally varying the synchronization ratio K simultaneously with variations in the forward speed V_fwd. These variations of the forward speed V_fwd could possibly be unintended or to the contrary intentionally commanded in the context of double control, including control of forward speed V_fwd and simultaneously control of synchronization ratio K.

The variable synchronizer 40 preferably employs at least one synchronization law L40 which, as is shown for example in FIGS. 10 and 11, dynamically modifies the synchronization ratio K when the first blade 21 is engaged on the continuous strip 2, between the first edge 2A and the second edge 2B, so as successively to fix a plurality of synchronization ratios of different value K1, K2, K3 over the same cutting width W2 of the continuous strip 2.

For the rest, it will be noted that a variable synchronization principle of this kind is potentially applicable whatever the arrangement of the cutting member that is mounted to be mobile transversely to the continuous strip 2 and in particular regardless of the arrangement of the helical blade 21.

In fact, there could for example be used a cutting member of laser, waterjet type, and likewise controlling the movement of said cutting member in translation transversely, preferably perpendicularly, to the longitudinal direction L2, that is to say controlling the relative cutting speed V_rel thereof as a function of the forward speed V_fwd and of the cutting angle A_cut that are required, and therefore as a function of the forward speed V_fwd and of the required synchronization ratio K.

A first application of this kind of control of the synchronization ratio K, and therefore of reorientation in real time of the tangent to the cutting line T_cut as the cutting member, here the first helical blade 21, progresses over the width of the continuous strip 2, may, in accordance with a characteristic that may constitute an invention in its own right, be the production of cutting lines T_cut that are intentionally not rectilinear, for example convex or conversely concave, in the form of broken lines or indeed in the form of curved lines.

There could in particular be conferred on the cut front edge of a strip 5 a convex shape projecting longitudinally relative to the strip 5, or conversely a concave shape, whether in the form of a broken line or in the form of a curved line, with the aim of adapting the shape of said cut front edge to applying said strip 5 to a warped surface, such as a conical or toroidal surface.

In fact, applying to a warped surface an initially plane strip 5 that has a rectilinear cut front edge will generate an offset termed the "edge radius" between said rectilinear cut front edge and the corresponding edge of the warped surface, because said rectilinear cut front edge does not correspond to said warped surface when developed.

Conversely, if the cut front edge of the strip 15 is corrected to confer on it a non-rectilinear cutting line T_cut, for example a convex line if it has to espouse a convex warped surface, that substantially corresponds to said warped surface when developed, then the strip would perfectly espouse the edge concerned of said warped surface (or where appropriate any so-called "parallel" line corresponding to the intersection of said warped surface with a plane normal to the axis of revolution of said warped surface, by analogy with lines parallel to the equator of a sphere).

A second application of controlling the synchronization ratio K may be compensation of "edge effects" linked to the behavior of the continuous strip at the level of the edges 2A, 2B during the cutting action exerted by the cutting rollers 20, 30.

The inventors have in fact found that when it is wished to make a cut at a predetermined cutting angle A_cut it is observed, at the start of the cut, that is to say when the first blade 21 reaches the first edge 2A and engages therewith to penetrate into the continuous strip 2, that the first edge 2A tends to flex and elastically to absorb the cutting force, and therefore to shy away from the action of the blade 21, while the first blade 21 tends to slide along the reinforcing cord 4, so that it is difficult to cut the first edge 2A and to engage the continuous strip 2 cleanly, exactly at the required cutting angle A_cut. There is seen here a first edge effect associated with the leading edge.

Figure 19A:
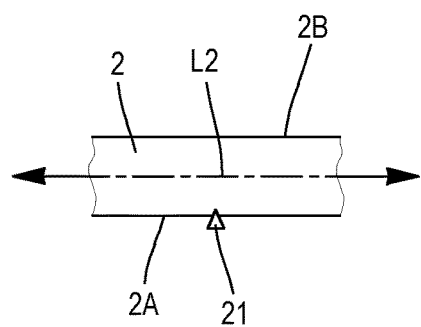
FIGS. 19A and 19B show, in schematic views from above, the principle of deformation of the continuous strip linked to the reduction of the cross section of said continuous strip during the cutting operation.
Figure 19B:
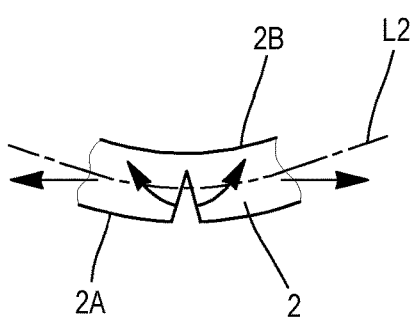

Conversely, at the end of cutting, the closer the second edge 2B is approached, the more the residual section that retains the strip 5 being detached from the rest of the continuous strip 2 decreases, and therefore weakens, which renders the continuous strip 2 softer and therefore more liable to deform. In particular, as shown schematically in FIGS. 19A and 19B, because of the effect of the traction forces exerted by the drive device 10 and/or by the assembly support 103 on the continuous strip 2, respectively on the strip 5 being detached, the continuous strip 2 tends to open up in the area of the cutting line T_cut already travelled, and therefore to become curved in yaw, as if it were tearing; this is somewhat equivalent, geometrically, to causing local diversion of the longitudinal direction L2 of the material constituting the continuous strip from the overall longitudinal direction L2. If a constant cutting angle set point is maintained on approaching the second edge 2B, there is therefore a tendency to obtain an actual cutting line T_cut that diverges from the required cutting line T_cut, tending to move away from the nominal longitudinal direction L2. There is then obtained a "blunted" cutting line T_cut that forms a sort of rounded bead at the bevelled tip of the front edge of the continuous strip 2 that results from the cutting operation. There is therefore observed here a second edge effect associated with the trailing edge 2B.

This is why the synchronization law L40 preferably adapts the synchronization ratio K to compensate so-called "edge effects" that are linked to the elastic deformation behavior of the continuous strip 2 at the level of its edges 2A, 2B, by applying a synchronization ratio K, K1 increased at the level of the leading edge 2A, that is to say here at the level of the first edge 2A, and/or respectively by applying a synchronization ratio K, K3 reduced at the level of the trailing edge 2B, that is to say here at the level of the second edge 2B.

In other words, the disclosure proposes to increase the synchronization ratio K at the level of the leading edge 2A and to reduce the synchronization ratio K at the level of the trailing edge 2B.

The absolute value of the reduced synchronization ratio K, K3 that is applied at the level of the trailing edge 2B is preferably strictly lower than the absolute value of the increased synchronization ratio K, K1 that is used at the level of the leading edge 2A.

By "increased" is meant that the absolute value of the synchronization ratio K, K1 actually applied is increased, that is to say chosen to be strictly greater relative to the so-called "nominal" synchronization ratio that theoretically, that is to say in the absence of edge effects, would correspond geometrically to the required cutting angle A_cut. The increase relative to nominal synchronization to obtain the increased synchronization ratio actually applied as set point for controlling the cutting rollers 20, 30 corresponds of course to the degree of correction that it necessary for the compensation of the edge effect concerned. This increase may be determined empirically for each type of continuous strip 2 by appropriate tests.

By applying an increased synchronization ratio K1 at the level of the leading edge 2A the cutting direction relative to said leading edge 2A is initially oriented at a more marked (more accentuated) penetration angle than the target nominal cutting angle, which procures an improved cutting force and therefore facilitates sectioning the first edge 2A of the continuous strip 2 and of the corresponding reinforcing cord 4.

Conversely, by "decreased" is meant that on approaching the trailing edge 2B the absolute value of the synchronization ratio K, K3 is reduced to be strictly lower than the absolute value of the nominal synchronization ratio by an amount that corresponds to the degree of correction appropriate to the compensation of the divergence caused by the edge effect concerned, which compensation therefore consists here in moving the cutting angle toward the nominal longitudinal direction L2.

It will be noted, in particular, and in accordance with a feature that may constitute an invention in its own right, that the invention makes it possible to provide a synchronization ratio K, K1, K3 and therefore a cutting angle A_cut, A_cut1, A_cut3 that is different at the level of the leading edge 2A than at the level of the trailing edge 2B and that in particular is higher at the level of the leading edge 2A than at the level of the trailing edge 2B.

In accordance with a preferred application example, the synchronization law L40 is defined in such a manner as to enable a rectilinear actual cutting line T_cut to be obtained that forms, relative to the longitudinal direction L2 of the continuous strip 2, a predetermined cutting angle termed the "nominal cutting angle" A_cut2 to which there geometrically corresponds a synchronization ratio termed the "nominal synchronization ratio" K2.

The synchronization law L40 may then preferably, in such a manner as to be able to compensate at least in part the deformations of the continuous strip 2 induced by the cutting operation in the vicinity of the first and second edges 2A, 2B, comprise at least three successive phases as shown in FIG. 10:
  a first phase Ph1 termed the "leading phase", in which the synchronization law L40 applies, when the first blade 21 reaches and passes the first edge 2A forming a leading edge, a first synchronization ratio termed the "leading synchronization ratio" K1 the absolute value of which is strictly greater than the absolute value of the nominal synchronization ratio K2; this leading synchronization ratio K1 therefore corresponds to a cutting angle A_cut1 that is greater than the nominal cutting angle A_cut2, that is to say that diverges more from the longitudinal direction L2 of the continuous strip 2 than said nominal cutting angle A_cut2,
  then a second phase Ph2 termed the "nominal cutting phase", in which the synchronization law L40 reduces the absolute value of the synchronization ratio to apply a second synchronization ratio equal to the nominal synchronization ratio K2 corresponding to the nominal cutting angle A_cut2,
  then a third phase Ph3 termed the "trailing phase" in which the synchronization law L40 further reduces the absolute value of the synchronization ratio so as, on approaching the second edge 2B and when passing a second edge 2B forming a trailing edge, to apply a third synchronization ratio K3 termed the "trailing synchronization ratio" the absolute value of which is strictly lower than the absolute value of the nominal synchronization ratio K2; this trailing synchronization ratio K3 corresponds to a cutting angle A_cut3 that is less than the nominal cutting angle A_cut2, that is to say that diverges less from the longitudinal direction L2 of the continuous strip 2 than the nominal cutting angle A_cut2.

The variations of the synchronization ratio K will advantageously make it possible to correct the edge effects and thus in the end to obtain an actual cutting line T_cut that will be truly rectilinear.

In the example mentioned above the law subdivides the width W2 of the continuous strip 2 into three successive sections W2_1, W2_2, W2_3 each assigned a different synchronization ratio K1, K2, K3 the absolute value of which here decreases from one section to the other, so that the cutting angle A_cut1, A_cut2, A_cut3 is progressively moved toward the longitudinal direction L2 of the continuous strip 2.

Of course, the transitions between the various synchronization ratios K1, K2, K3 and therefore the transitions between the successive sections W2_1, W2_2, W2_3 mentioned above could preferably be progressive and typically correspond to necessary phases of acceleration and then of deceleration of the first blade 21, and more generally to necessary phases of acceleration and then deceleration of the cutting rollers 20, 30, relative to the forward speed V_fwd because the speeds, in particular the rotation speed R20 of the first cutting roller 20 and consequently the relative cutting speed V_rel, and therefore the synchronization ratio K, cannot in practice be modified in a discontinuous manner.

As is shown in FIG. 10, the synchronization coefficient could preferably be constant in plateaus, each of said plateaus corresponding to one of the values K1, K2, K3 associated with one of the various phases Ph1, Ph2, Ph3 mentioned above.

As can be seen in FIG. 10, the transitions between the constant value plateaus will be continuous, for example in accordance with ramps or laws of evolution of an appropriate degree, that is sufficiently high to obtain accelerations or decelerations of the cutting rollers 20, 30 that will not damage said cutting rollers 20, 30 and their drive motors, and that limit inertia phenomena.

As mentioned above, there will preferably be considered as the master value the forward speed V_fwd of the continuous strip 2 and/or in an analogous manner the forward speed V_fwd of the strip 5 leaving the cutting system 1 and consequently the rotation speed R20 of the first cutting roller 20 and that R30, with the same absolute value, of the second cutting roller 30 will be controlled in such a manner as to obtain the required synchronization ratios K, K1, K2, K3.

Without departing from the scope of the disclosure, it would nevertheless be perfectly appropriate to act also on the forward speed V_fwd by means of the drive device 10 to adjust the synchronization ratio K.

In all case, thanks to the variable synchronizer 40, and for any forward speed V_fwd concerned, it continues to be possible to choose and to vary the synchronization ratio K among a plurality of synchronization ratios available at the forward speed V_fwd concerned.

Figure 1:
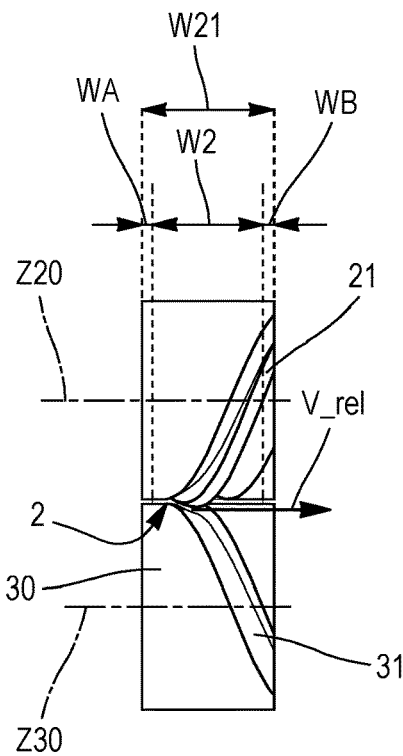
FIG. 1 shows, in a side view, an example of a pair of contrarotating cutting rollers in accordance with the disclosure.
Figure 2:
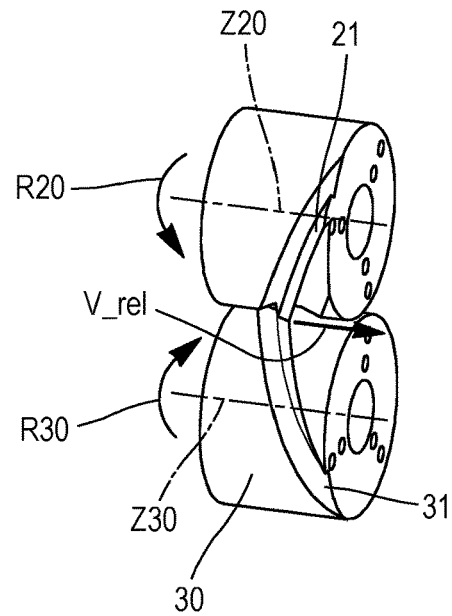
FIG. 2 shows, in a perspective view, the cutting rollers from FIG. 1.
Figure 13:
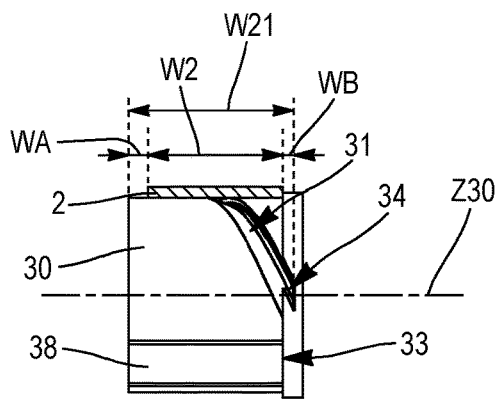

In accordance with one feature that may constitute an invention in its own right, the first helical blade 21 preferably covers, along the first rotation axis Z20 of the first cutting roller 20, an axial distance termed the "usable blade width" W21 that is strictly greater than the overall width W2 of the continuous strip 2 so as to provide, as is shown schematically in FIGS. 1 and 13, on the one hand, projecting from the first edge 2A along said first rotation axis Z20, an upstream lateral clearance WA that enables the variable synchronizer 40 to bring the rotation speed R20 of the first cutting roller 20 to a required value corresponding to the required synchronization ratio K, K1 before the first blade 21 comes into contact with the continuous strip 2 at the level of the first edge 2A of said continuous strip and, on the other hand, projecting from the second edge 2B along said first rotation axis Z20, a downstream lateral clearance WB that makes it possible to continue, beyond the second edge 2B, the first rotation R20 and therefore the routing of the first blade 21 that corresponds to the cutting action exerted by said first blade, so that the synchronization ratio K remains controllable at least until the moment at which the strip 5 is detached completely from the continuous strip 2.

The upstream lateral clearance WA advantageously makes it possible to impart movement to the first cutting roller 20 and to accelerate the latter until an established regime is reached that corresponds to the required leading synchronization ratio K1 before the first blade 21 reaches and engages the continuous strip 2. As a result, the cutting action can be engaged in a clear and homogeneous manner.

Likewise, the downstream lateral clearance WB enables the first blade 21 to continue its cutting action beyond the second edge 2B, and more particularly to apply the trailing synchronization ratio K3 beyond said second edge 2B, and then to slow down and to stop the first cutting roller 20 only after the first blade 21 has crossed said second edge 2B. As a result, premature interruption of the cutting action before the strip 5 is totally separated from the continuous strip 2 is avoided.

It is therefore possible to master the cutting action effectively by carrying out the transient phases of starting the cutting rollers 20, 30 upstream of the first edge 2A and then stopping the cutting rollers 20, 30 downstream of the second edge 2B outside the width W2 of the strip 2.

Of course, if the second cutting roller 30 has a shape conjugate to the first blade 21, for example a helical groove 31, said conjugated shape could equally cover an axial distance along its rotation axis Z30 at least equal to the usable blade width W21, preferably equal to the usable blade width W21 if the two rotation axes Z20, Z30 are parallel.

Figure 12:
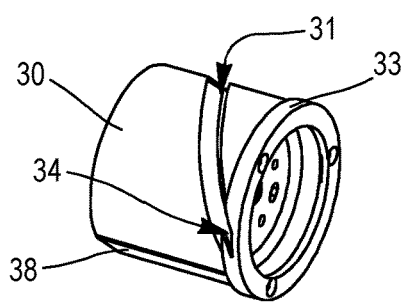
FIGS. 12 and 13 show, respectively in a perspective view and in a side view, an example of a second cutting roller including a smooth bearing surface and a helical groove, into which the helical blade penetrates.
Figure 14:
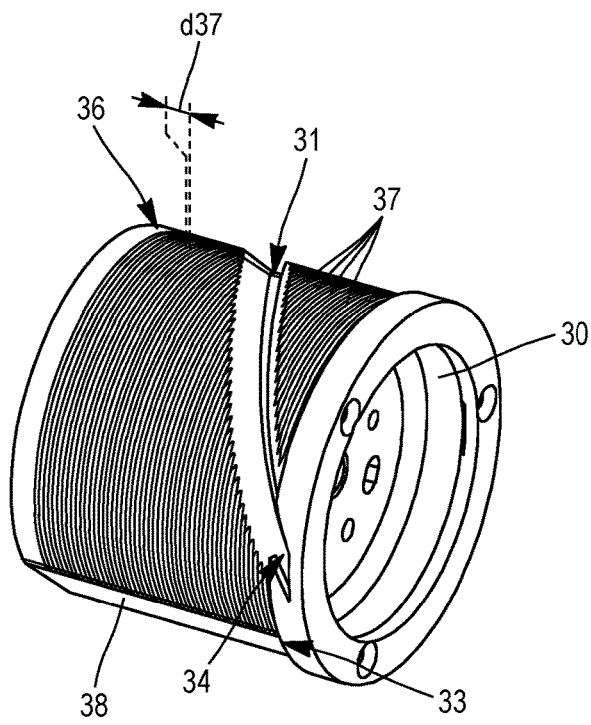
FIG. 14 shows, in a perspective view, an example of a second cutting roller including a helical groove and, this time, a striated surface comprising a plurality of annular grooves intended to improve the lateral retention of the continuous strip, in particular when said continuous strip contains reinforcing cords parallel to its edges.

As is shown in FIGS. 12, 13 and 14, at least one of the first and second cutting rollers 20, 30, preferably the second cutting roller 30, preferably comprises a guide shoulder 33 that is arranged to form a lateral stop against the first edge 2A or the second edge 2B.

A guide shoulder 33 of this kind will advantageously assure lateral retention of the continuous strip 2 during cutting, delimiting the strip path T2 along the rotation axis Z20, Z30 of the cutting roller 20, 30 concerned.

Said preferably annular guide shoulder 33, which is preferably on the second cutting roller 30 in order not to interfere with the first blade 21, will more preferably be positioned so as to form a lateral stop against the second edge 2B, in order to oppose the cutting force component that is oriented transversely to the longitudinal direction L2 of the continuous strip, on the rotation axis Z30 of said second cutting roller 30, and directed in the cutting direction, from the first edge 2A to the second edge 2B.

In order to allow the downstream lateral clearance WB enabling the first blade 21 to continue its cutting action beyond the second edge 2B while said second edge 2B is bearing on the guide shoulder 33, said guide shoulder 33 will preferably be provided with a notch 34, as can be seen in FIGS. 12 to 14.

Said notch 34 will preferably correspond to an extension of the helical groove 31 of the second cutting roller 30.

As stated above, the cutting system 1 may preferably be intended to cut continuous strips 2 that comprise continuous reinforcing cords 4 that are arranged parallel to the first and second edges 2A, 2B with a predetermined pitch d4.

The pitch d4 corresponds to the spacing between two consecutive reinforcing cords 4 across the width W2 of the continuous strip 2.

Figure 15:
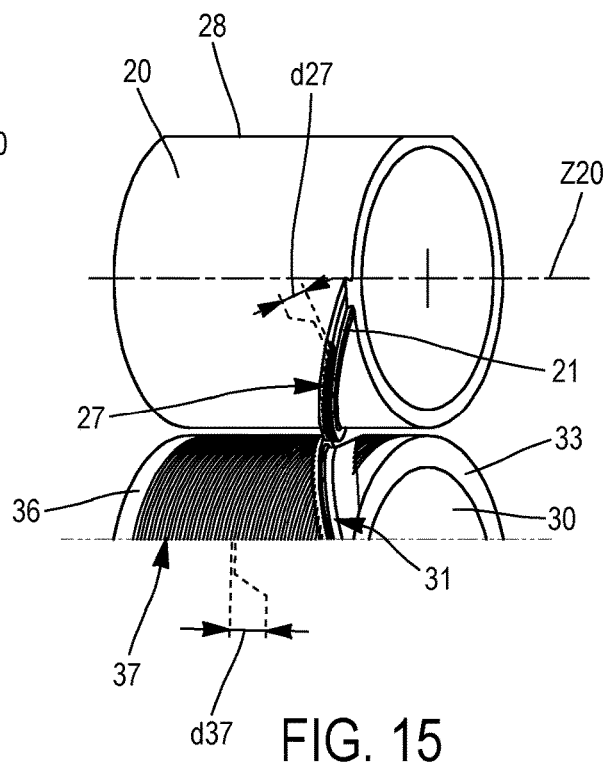
FIG. 15 shows, in a partial perspective view, a pair of cutting rollers comprising a second cutting roller in accordance with FIG. 14 cooperating with a first cutting roller the helical blade of which is striated in order to improve the lateral retention of the continuous strip during cutting.

As shown in FIGS. 14 and 15, the first and/or second cutting roller 20, 30, preferably the second cutting roller 30, may then advantageously and preferably comprise a cylindrical bearing surface 36 centered on the rotation axis Z30 of said cutting roller, on which the continuous strip 2 comes to bear, and which includes a series of annular grooves 37 oriented in the longitudinal direction L2 of the continuous strip 2 and therefore preferably perpendicularly to the rotation axis Z30 of the cutting roller 30, so that said grooves 37 contribute to lateral retention of the continuous strip 2 and/or of the 5 during the cutting operation.

Thanks to the elasticity of the rubber 3 sandwiched between the cutting rollers 20, 30, which therefore exert a pressure on the thickness of the continuous strip 2, the reinforcing cords 4 may advantageously penetrate tangentially into said grooves 37, which improves the guidance and the lateral retention of the continuous strip 2 during cutting.

The pitch d37 of axial distribution of the annular grooves 37, which are arranged parallel to one another along the rotation axis Z30, will preferably correspond to the pitch d4 of the reinforcing cords 4.

However, even if it is one implementation possibility, it is not absolutely necessary for the pitch d37 of distribution of the grooves 37 and the pitch d4 of distribution of the reinforcing cords 4 to be equal, because the inventors have found that, surprisingly, an effect of lateral retention of the continuous strip 2 could be obtained on implementing a series of annular grooves 37 with a pitch d37 greater than the pitch d4 of distribution of the reinforcing cords 4, for example a pitch d37 twice the pitch d4 of distribution of the reinforcing cords 4, which then, on average, enables one reinforcing cord 4 in two to be retained.

Because of this, it is advantageously not necessary systematically to change the striated second cutting roller 30 when the specification of continuous strip 2 to be cut is to changed, and more particularly when the pitch d4 of distribution of the reinforcing cords 4 is changed.

Thus in this respect the cutting system 1 is highly polyvalent.

Likewise, if the cutting system 1 is intended to cut continuous strips 2 comprising continuous reinforcing cords 4 arranged parallel to the first and second edges 2A, 2B with a predetermined pitch d4, then the first blade 21 may, as shown in FIG. 15, preferably comprise striations 27 oriented in the longitudinal direction L2 of the continuous strip 2, and therefore preferably perpendicularly to the rotation axis Z20 of the first cutting roller 20, so that said striations 27 contribute to lateral retention of the continuous strip 2 and/or of the strip 5 during the cutting operation.

The first blade 21 therefore forms a kind of serrated knife.

Said striations 27, which are parallel to one another, will preferably be spaced with an axial distribution pitch d27 that corresponds to the pitch d4 of the reinforcing cords: d27=d4.

Moreover, in a particularly preferred manner, the pitch d27 of the distribution of the striations 27 of the first cutting roller 20, whether said pitch d27 of the distribution of the striations is equal or not to the pitch d4 of the reinforcing cords, will be equal to the pitch d37 of the distribution of the grooves 37 of the second cutting roller 30 so that, at the cutting point, the striations 27 are aligned with the grooves 37, tangentially to the cutting rollers 20, 30 and to the longitudinal direction L2.

Grooves 37 and striations 27 will therefore be perfectly complementary.

The axial width of the recessed imprints of the grooves 37, respectively of the striations 27, could preferably correspond to the diameter of the reinforcing cords 4, to optimize the quality of the reception and the retention of the reinforcing cords 4 in said imprints.

It will further be noted that the use of grooves 37 and/or striations 27 is particularly suitable for cutting continuous strips 2 that are reinforced by single-strand ("single wire") reinforcing cords 4.

Moreover, in accordance with a preferred feature that may constitute an invention in its own right, the first blade 21 covers less than one helical pitch around the first cutting to roller 20, that is to say less than 360 degrees around its rotation axis Z20, in such a manner that said first cutting roller 20 has, in azimuth around the first rotation axis Z20, as can be seen in FIGS. 7 and 8, on the one hand an angular cutting sector S20_cut occupied by the first blade 21 and on the other hand a free passage angular sector S20_free where there is no blade and that is adapted to allow the continuous strip 2 to pass between the first and second cutting rollers 20, 30 without subjecting said continuous strip 2 to any cutting action.

In other words, the first blade 21, without making a complete turn around the first cutting roller 20, is interrupted in such a manner as to define on the one hand a cutting angular sector S20_cut that enables the cut to be made and on the other hand a non-cutting angular sector S20_free that allows the continuous strip 2 to pass freely over the necessary length between two successive cutting lines T_cut.

The same is obviously the case for the second cutting roller 30, the groove 31 of which preferably occupies less than one helical pitch around the axis Z30 of the second cutting roller 30, so as to form on the one hand a cutting angular sector S30_cut occupied by the helical groove 31 and on the other hand a free passage angular sector S30_free.

The cutting system 1 therefore enables the cutting rollers 20, 30 to be actuated in a discontinuous manner, by activating the rotation R20, R30 of said cutting rollers over less than one turn to produce the cut by means of the cutting angular sectors S20_cut, S30_cut, and then, once the cut has been effected, interrupting said rotation R20, R30, while the free passage angular sectors S20_free, S30_free come to face the continuous strip 2 and therefore temporarily eliminate the radial interference between the cutting rollers 20, 30 to allow the free passage of said continuous strip 2.

The free passage offered to the continuous strip 2 between the angular sectors S20_free, S30_free in particular makes it possible to manage the transient phases of control of cutting, and in particular the phase of first acceleration of the cutting rollers 20, 30 to reach the leading rotation speed of the first edge 2A conforming to the required leading synchronization ratio K1, and then the phase of deceleration and stopping of the cutting rollers 20, 30 once the cutting operation has been completed.

This free passage also makes it possible to manage the phases of starting movement, acceleration, deceleration and stopping of said continuous strip 2 necessary to adjust the forward speed V_fwd to the conditions of application.

Finally, this free passage makes it possible, after a first cut, to allow to pass between the cutting rollers 20, 30 a length of continuous strip 2 that corresponds to the required length of the strip 5 being produced, until the point is reached where the next cut starts, which enables said strip 5 to be detached from the continuous strip 2.

The successive cuts could therefore be made by single-turn control, each cycle of cutting and then of free movement of the continuous strip 2 being produced by effecting a single rotation of each cutting roller 20, 30.

All the successive single-turn rotations corresponding to the plurality of cutting lines produced successively to produce a series of strips 5 will preferably always be effected in the same direction, which depends on the orientation of the helix angle of the first blade 21 relative to the continuous strip 2.

By activating the cutting rollers 20, 30 only intermittently, only when a cut is necessary, energy is advantageously economized.

It will be noted for the rest that this capacity of the cutting system 1 to adopt an intermittent activation mode, that is to say this ability to start (or cease) the rotation of the cutting rollers 20, 30 independently of the value of the forward speed V_fwd, and more particularly independently of the fact that the continuous strip 2 is either stopped (V_fwd=0) or in motion (V_fwd>0), and even more particularly the capacity to be able alternately to stop and then to restart the rotation of the cutting rollers 20, 30 with helical cutting members 21, 31 without interrupting the movement at a non-zero forward speed V_fwd of the continuous strip 2 between said cutting rollers 20, 30, may constitute an invention in its own right.

Furthermore, the proposed arrangement avoids having to move the cutting rollers 20, 30 and in particular having alternately to move the cutting rollers 20, 30 away from the strip path T2 to allow free movement of the continuous strip 2 and then to move said cutting rollers 20, 30 closer to the strip path T2 again to make a cut.

Thanks to the arrangement, in this instance thanks to the alternation, of the cutting angular sectors S20_cut, S30_cut and respectively free passage sectors S20_free, S30_free in accordance with the invention, it is in fact possible to preserve a time-invariant distance between the axes of the two cutting rollers 20, 30 since the first rotation axis Z20 and the second rotation axis Z30 may remain fixed at a constant distance from the strip path T20; this guarantees the precision and the reproducibility of the successive cuts.

In a particularly preferred manner, the respective cutting angular sectors of the first roller S20_cut and of the second cutting roller S30_cut will be substantially or even exactly the same size, that is to say will cover substantially or even exactly the same angular coverage.

Moreover, the angular positions of the first and second cutting rollers 20, 30 will preferably be indexed in such a manner that, upon the synchronous contrarotation of said cutting rollers 20, 30, the cutting angular sectors S20_cut, S30_cut coincide with one another.

The same will preferably apply to the free passage angular sectors S20_free, S30_free, which will preferably have identical dimensions, and will coincide with one another upon the rotation R20, R30 of the cutting rollers 20, 30.

The cutting angular sector S20_cut, S30_cut will preferably have an angular coverage around the rotation axis Z20, Z30 concerned between 190 degrees and 220 degrees inclusive.

The ranges of angular coverage advantageously take into consideration the developed length necessary to cross the width W2 of the continuous strip in producing a strip point the cutting angle A_cut of which may reach any value in the required range of cutting angles.

The free passage angular sector S20_free, S30_free will preferably correspond to the 360 degrees complement of the cutting angular sector S20_cut, S30_cut.

Moreover, it will be noted that the first and second cutting rollers 20, 30 are preferably arranged so as to attack the front edge of the continuous strip 2 at only one point on the width W2 of said continuous strip 2.

In other words, an effect of the cutting system 1 is to cut the continuous strip 2 at predetermined length intervals to form strips 5 that keep the same width W2 as the width W2 of said continuous strip 2 and not to subdivide widthwise, or "slash", said continuous strip 2 into a plurality of sub-strips that will then have respective widths less than the width W2 of said continuous strip.

To this end, the first cutting roller 20 comprises only one blade 21, and more generally the cutting system 1 comprises only one set of cutting members (first blade 21 and groove 31, for example), in that said blade 21, 22, respectively the corresponding helical groove 31, 32, extend in only one thread (only one helix) around their respective rotation axis Z20, Z30.

It is in fact clear that if, on the other hand, there were provided over the same continuous strip width W2 a plurality of blades 21 or a plurality of sets of cutting members 21, 31, 22, 32, disposed in a plurality of threads that would have the same pitch but would be offset angularly relative to one another about their rotation axis Z20, Z30 or again if cutting members were provided that covered more than one turn around their axis with a helix pitch less than the strip width W2, then the cutting members 21, 31, 22, 32 would engage the front edge of the continuous strip 2 simultaneously at a plurality distinct points distributed across the width W2 of said continuous strip 2, the effect of which would be to slash the continuous strip 2 into a plurality of narrower sub-strips.

In absolute terms, there is certainly nothing to rule out using a system with a plurality of threads enabling such slash type cutting.

However, in some applications, it will be preferably to keep intact the width W2 of the continuous strip in order to simplify the management of directly applying the strips 5 resulting from said cutting operation immediately after the cutting operation and therefore having the same width as the width W2 of the continuous strip 2.

In accordance with a preferred arrangement, the free passage angular sector S20_free, S30_free could preferably comprise a flat 28, 38 that places the surface of the first cutting roller 20, respectively the surface of the second cutting roller 30, set back from the strip path T2.

By means of a solution that is simple to implement it is therefore possible to obtain between the cutting rollers 20, 30 a largely unobstructed space for the passage of the continuous strip 2, typically greater than the thickness of said continuous strip 2, which limits or even prevents rubbing and therefore abrasion of the continuous strip 2 on the cutting rollers 20, 30 while the continuous strip 2 is passing freely between said cutting rollers 20, 30.

Of course, once again here considerations may apply mutatis mutandis to the first cutting roller 20 and to the second cutting roller 30, and preferably to each of the two cutting rollers 20, 30, as can be seen in FIGS. 7 and 8.

It will be noted that, if necessary, a free passage angular sector S20_free, S30_free could be provided with no flat 28, 38 provided that the difference in radius that marks the transition between the cutting angular sector S20_cut, S30_cut and the free passage angular sector S20_free, S30_free is sufficient to offer free passage to the continuous strip 2, preventing the risks of jamming or abrasion of said continuous strip 2.

In such a case, in the free passage configuration, the relative proximity of the respective surfaces of the free passage sector S20_free of the first cutting roller 20 and the free passage sector S30_free of the second cutting roller 30 could advantageously offer relatively precise guidance of the continuous strip 2.

Figure 16:
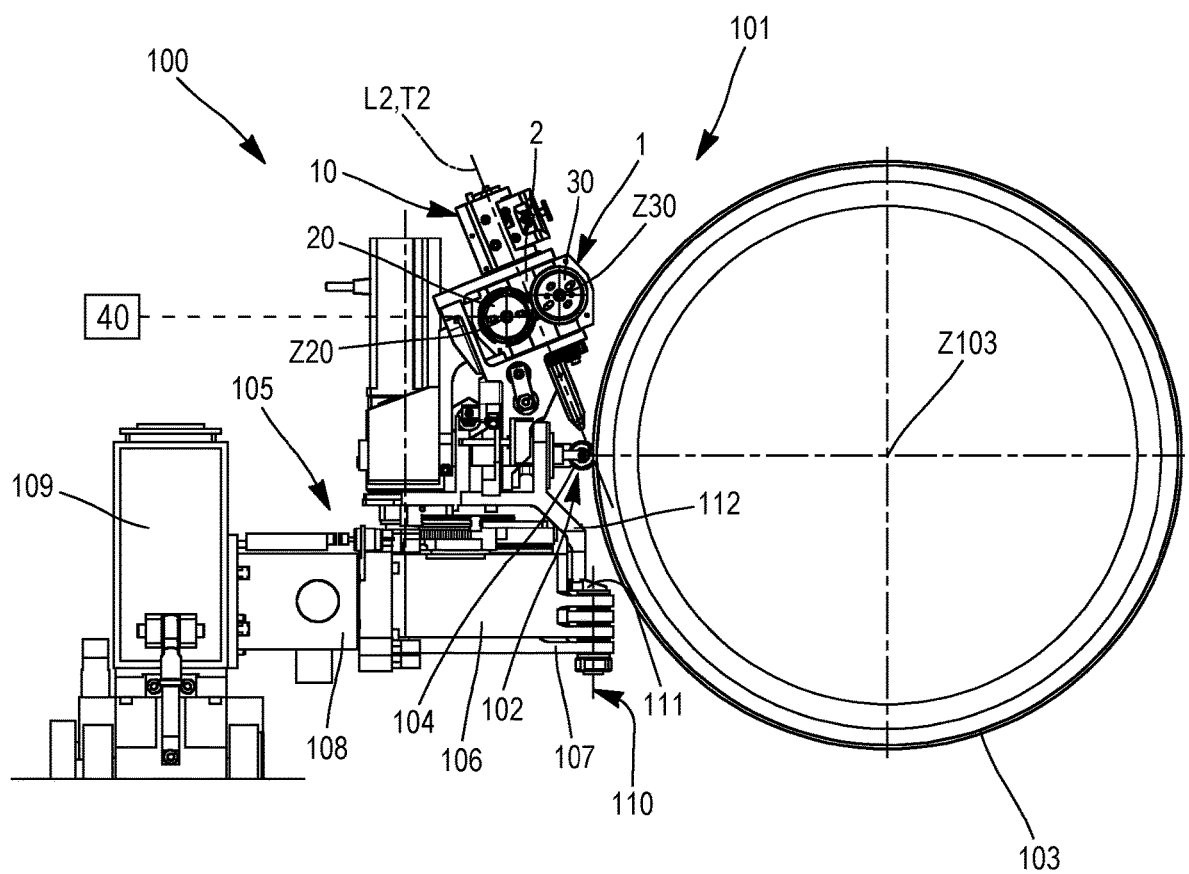
FIG. 16 shows, in a side view, an example of a reinforcement ply fabrication installation utilizing a robot of parallel robot type, that is to say that comprises a closed kinematic chain mechanism the terminal member of which is connected to a base by a plurality of independent kinetic chains or "arms", and to be more specific a robot of Cartesian type, that is to say one that follows a system of Cartesian coordinates, said robot being provided here with an applicator head fed with strips by a cutting system in accordance with the disclosure and adapted to deposit successively and to abut said strips on an assembly support, such as a cylindrical drum, a toroidal core or any other warped surface.
Figure 18:
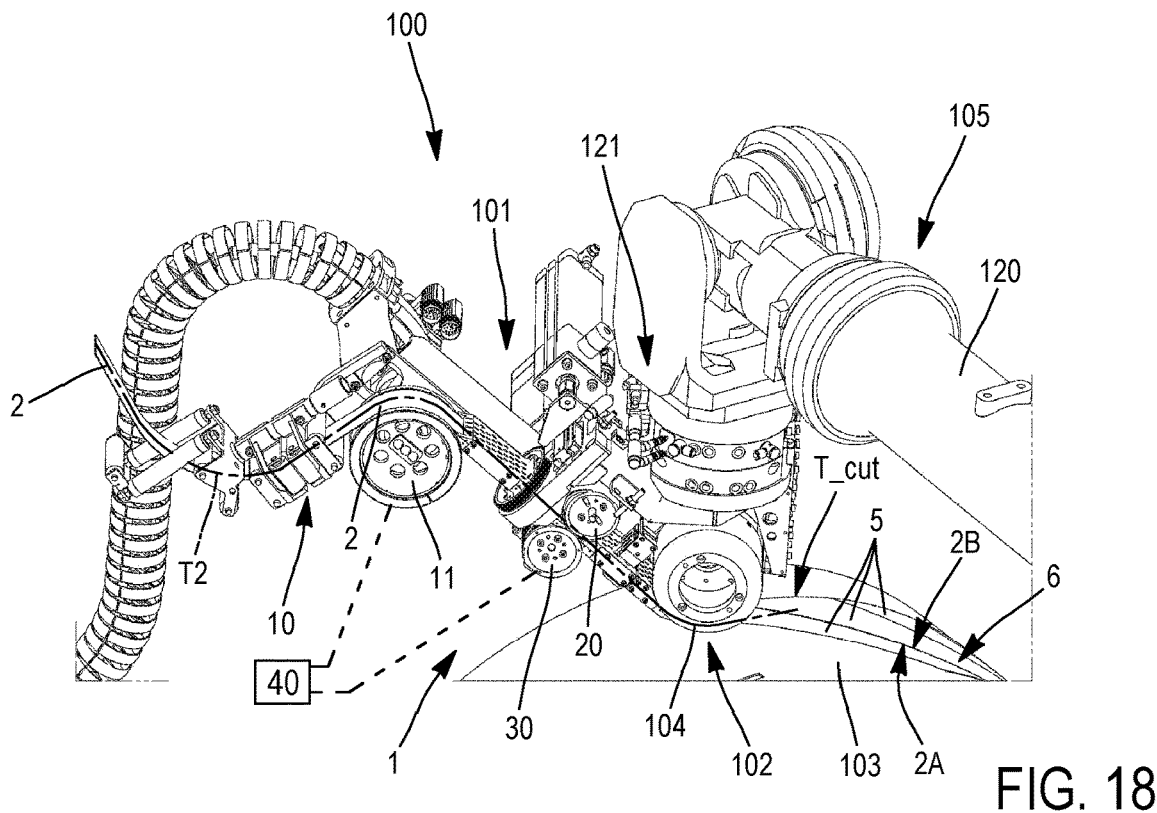
FIG. 18 is a detail view in perspective of a part of the robot from FIG. 17.

The disclosure also relates to an installation 100 for fabricating reinforcement plies 6 for tires, in particular pneumatic tires, as shown in FIGS. 16, 17 and 18.

Said installation 100 comprises firstly a strip preparation device 101 that produces strips 5 by cutting said strips 5 by means of a cutting system 1 in accordance with the disclosure in a continuous strip 2 termed the "zero degree belt" that is formed of at least one layer of rubber layer 3 reinforced by a plurality of continuous reinforcing cords 4, preferably made of metal and of single wire type, that extend parallel to one another in the longitudinal direction L2 of the continuous strip 2.

Said installation 100 also comprises an applicator head 102 that is adapted to apply said strips 5 successively onto an assembly support 103 and to abut said strips 5 successively one to another at their edges 2A, 2B so as to constitute a reinforcement ply 6.

The assembly support 103 may be a conveyor, of the flat conveyor type, or have a revolution shape and for example form a cylindrical drum or a toroidal core.

Possibly, the toroidal core has substantially the shape of the tire with which it is wished to integrate the reinforcement ply 6.

The cutting system 1 in accordance with the disclosure advantageously makes it possible to prepare successively, in real time, by on the fly cutting, the strips 5 as and when they are placed on the assembly support 103.

The strips 5 being produced as and when they are used, this therefore avoids any wastage of energy or of raw material.

Moreover, the multipurpose nature of the cutting system 1 makes it possible at any time to adapt the length of the strips 5 or the cutting line T_cut of each front edge of each of said strips 5, and in particular, when said front edge forms a rectilinear bevel, to adapt the cutting angle A_cut at which said bevel is oriented.

As can be seen in FIGS. 16 and 18 in particular, the applicator head 102 preferably comprises a presser member 104, such as a presser roller 104 that is adapted to press the strip 5 against the assembly support 103.

In accordance with a preferred feature that may constitute an invention in its own right, the cutting system 1 is then adapted to cut the strip 5 on the fly while said strip 5 is already engaged on the assembly support 103 and in the process of being placed on said assembly support 103 at a non-zero speed that corresponds to the forward speed V_fwd at which the continuous strip 2 travels the strip path T2 between the first cutting roller 20 and the second cutting roller 30.

Recourse to helical cutting members 21, 31, 22, 32 advantageously makes it possible to make the cut that enables separating the strip 5 from the continuous strip 2 and in particular severing the corresponding reinforcing cords 4, virtually without exerting any longitudinal retaining force on the strip 5 that is being applied.

Accordingly, there may be carried out simultaneously on the one hand the application of the strip 5 to the assembly support, which implies feeding and unwinding said strip 5 over the length necessary for the speed required by the presser member 104 that pinches the strip 5 against the assembly support 103, and on the other hand cutting said strip 5, without creating tension, elongation or tearing of the strip 5 or the continuous strip 2, in particular on the portion of the strip path T2 that extends from the cutting rollers 20, 30 to the point where the presser member 104 presses the strip 5 against the assembly support 103.

The installation 100 and more particularly the sub-assembly formed by the applicator head 102 and the cutting system 1 can therefore be very compact.

Moreover, these simultaneous operations of cutting and applying the same strip 5 are advantageously achieved without it being necessary to slow or to stop the forward movement of the strip 5 to proceed to cutting.

The disclosure therefore makes it possible to optimize the rate of making available and applying the strips 5.

The presser roller 104 preferably forms part of the drive device 10 and defines the "master" axis that conditions the forward speed V_fwd while the variable synchronizer 40 regulates, as a function of that forward speed V_fwd and of the required cutting angle A_cut, the rotation speed R20 of the first cutting roller 20, and therefore also the corresponding rotation speed R30 of the second cutting roller 30, which constitute the "slave" axes of control.

Of course, the control of the forward speed V_fwd and of the rotation speed R20 of the rollers 20, 30 and the regulation of the synchronization ratio K that links these parameters to one another could be carried out by means of any appropriate computer integrated into the variable synchronizer 40.

There may moreover be envisaged any type of manipulator 105 appropriate to positioning and moving the applicator head 102 facing the assembly support 103.

In accordance with a possible variant embodiment shown in FIG. 16, the manipulator 105 could form a Cartesian robot with deformable triangular structure, comprising two arms 106, 107 each mounted on its own carriage 108 mobile in translation on a base 109, said arms 106, 107 having a pivot articulation 110 to form a seat 111 that supports a platform 112 that can be oriented in yaw and that bears the applicator head 102 and the cutting system 1.

The carriages bearing the arms 106, 107 are individually mobile in translation, preferably along a guide axis oriented parallel to the central axis Z103 of the assembly support 103 so as to be able to move the base of the triangular structure and/or to modify the length of said base and thus to move the seat 111 relative to the base 109 and relative to the assembly support 103 in any Cartesian position freely chosen in a reference plane normal to the axis of the pivot 110.

The oblique application of each strip 5 at the chosen ply angle A6 could be achieved by combining movement in translation of the seat 111 along the central axis Z103 of the assembly support 103 and rotation of said assembly support 103 about its central axis Z103.

In accordance with another variant embodiment shown in FIGS. 17 and 18 the manipulator 105 may be formed by an "anthropomorphic" type robot arm 120 such as a six-axis robot arm.

The applicator head 102 and the cutting system 1 will preferably be mounted on the same subassembly that the wrist 121 of the robot arm 120 bears.

Said robot arm 120 is preferably associated with an assembly support 103 having a revolution shape and, here again, the oblique application of each strip 5 at the chosen ply angle A6 could be achieved by combining movement in translation of the wrist 121 along the central axis Z103 of the assembly support 103 and rotation of said assembly support 103 about its central axis Z103.

In accordance with a further application variant the cutting system 1 could be used to cut on the fly a zero degree belt composed of a plurality of continuous strips 2 that would, before the cutting operation, have been abutted one against the other parallel to the longitudinal direction of their respective reinforcing cords 4 to form said zero degree belt.

Cutting on the fly in this way could take place between on the one hand an unwinding/splicing station in which continuous strips are unwound and then abutted two by two to form a zero degree belt the frontal width of which is greater than the individual front width W2 of each of said continuous strips 2 and on the other hand a storage/winding station at the level of which the zero degree belt is stored on a buffer spool adapted to contain a predetermined length of said zero degree belt.

The cutting on the fly would then occur when the quantity of zero degree belt wound onto the buffer spool reaches the required predetermined length.

Here again, recourse to a cutting system 1 in accordance with the disclosure enables cutting on the fly using a compact system 1 while the zero degree belt is already engaged on the buffer spool, because of the winding already effected, and said zero degree belt is driven at a non-zero forward speed V_fwd.

The disclosure finally relates to a method in accordance with one or the other of the features described hereinabove.

The disclosure more particularly concerns a method of producing strips 5 during which successive strips 5 are produced by cutting a strip termed the "continuous strip" 2 that extends lengthwise in a direction termed the "longitudinal direction" L2 and widthwise W2 between a first edge 2A and a second edge 2B, by feeding said continuous strip 2 at a particular speed termed the "forward speed" V_fwd that is oriented in the longitudinal direction L2 of said continuous strip 2 along a strip path T2 that passes between a first cutting roller 20 provided with a first helical blade 21 and a contrarotating second cutting roller 30, by driving said first cutting roller 20 in a first movement in rotation R20 at a chosen rotation speed about a first rotation axis Z20 oriented transversely to the strip path T2, preferably perpendicularly to said strip path T2, so as to travel and to cut all the width W2 of said continuous strip 2 from the first edge 2A to the second edge 2B, and by controlling by means of a variable synchronizer 40 the forward speed V_fwd conferred on the continuous strip 2 and the rotation speed R20 of the first cutting roller 20 so as to be able to select and to modify the ratio termed the "synchronization ratio" K between the rotation speed R20 of the first cutting roller 20 and the preferably non-zero forward speed V_fwd of the continuous strip 2, in such a manner as to be able to adjust the angle termed the "cutting angle" A_cut at which the cutting of the continuous strip 2 is oriented relative to the longitudinal direction L2 of said continuous strip 2.

As indicated above, this amounts to, for any forward speed V_fwd considered, in particular for any non-zero forward speed V_fwd considered, selecting, and being able to modify in a range of predetermined values, the ratio between on the one hand the speed termed the "relative cutting speed" V_rel that is the result of the rotation speed of the first cutting roller 20 and that the point of the first helical blade 21 that is engaged with the continuous strip at the moment concerned during the cutting operation traces out, transversely to the longitudinal direction L2 of the continuous strip, and on the other hand the forward speed V_fwd, and this in such a manner as to be able to adjust the angle termed the "cutting angle" A_cut at which, at the moment concerned, the direction of cutting the continuous strip 2 is oriented relative to the longitudinal direction L2 of said continuous strip.

During this process, as shown in FIG. 11, the strip 5 is preferably cut along an actual cutting line T_cut that is rectilinear and oriented at a predetermined cutting angle termed the "nominal cutting angle" A_cut2 relative to the longitudinal direction L2 of the continuous strip 2, to which geometrically corresponds a synchronization ratio termed the "nominal synchronization ratio" K2, by applying successively: a first synchronization ratio termed the "leading synchronization ratio" K1 the absolute value of which is strictly greater than the absolute value of the nominal synchronization ratio K2, to engage and cross the first edge 2A, then a second synchronization ratio K2, lower than the first synchronization ratio and equal to the nominal synchronization ratio K2, then, on approaching the second edge 2B and when crossing said second edge, a third synchronization ratio termed the "trailing synchronization ratio" K3 the absolute value of which is strictly lower than the absolute value of the nominal synchronization ratio K2.

In this way, edge effects can be compensated and a resulting cutting line obtained that is actually rectilinear.

Of course, the disclosure is in no way limited only to the variant embodiments mentioned above, the person skilled in the art being in particular in a position to isolate or to combine freely with one another any of the features described hereinabove or to substitute equivalents for them.

What is claimed is:

1. A cutting system for cutting a continuous strip, the continuous strip extends lengthwise in a longitudinal direction and widthwise between a first edge and a second edge, said cutting system comprises:
    a drive device adapted to drive the continuous strip along a strip path at a forward speed that is oriented in the longitudinal direction of said continuous strip,
    a first cutting roller that is mounted so as to be able to be driven in a first movement in rotation at a chosen rotation speed about a first rotation axis oriented transversely to the strip path, said first cutting roller being provided with a first helical blade that extends helically around said first rotation axis,
    a second cutting roller that is mounted to rotate about a second rotation axis in a second movement in rotation in the opposite direction to the movement in rotation of the first cutting roller and that is adapted to be able, when the continuous strip is engaged between said first and second cutting rollers, to cooperate with the first helical blade to cut said continuous strip over all a width of said continuous strip from the first edge to the second edge,
    the drive device, the first cutting roller, and the second cutting roller being driven by at least one electric motor,
    a variable synchronizer controller in electrical communication with the at least one electric motor and configured to select and to modify a synchronization ratio between the rotation speed of the first cutting roller and the forward speed of the continuous strip in such a manner as to adjust a cutting angle at which a cut in the continuous strip is oriented relative to the longitudinal direction of said continuous strip, and
    wherein during a single cut of the continuous strip, the variable synchronizer controller employs at least one synchronization law that dynamically modifies the synchronization ratio while the first blade is engaged on the continuous strip, between the first edge and the second edge, so as successively to fix a plurality of synchronization ratios with different values.

2. The cutting system according to claim 1, wherein the first blade starts the cut at the first edge, the first edge is a leading edge and ends the cut at the second edge, the second edge is a trailing edge, and wherein the synchronization law adapts the synchronization ratio to compensate edge effects that are linked to an elastic deformation behavior of the continuous strip at a level of its edges by applying an increased synchronization ratio at the level of the leading edge and/or respectively a reduced synchronization ratio at the level of the trailing edge.

3. The cutting system according to claim 2, wherein the reduced synchronization ratio is less than the increased synchronization ratio used at the level of the leading edge.

4. The cutting system claim 1, wherein the synchronization law is defined in such a manner as to enable a rectilinear actual cutting line to be obtained that forms a nominal cutting angle relative to the longitudinal direction of the continuous strip, to which there geometrically corresponds to a nominal synchronization ratio, and wherein said synchronization law comprises, in such a manner as to compensate at least in part deformations of the continuous strip induced by the cutting operation in the vicinity of the first and second edges, at least three successive phase:
    a leading phase in which the synchronization law applies, when the first blade reaches and crosses the first edge forming a leading edge, a leading synchronization ratio that is strictly greater than the nominal synchronization ratio,
    then a nominal cutting phase in which the synchronization law reduces the synchronization ratio to apply a second synchronization ratio equal to the nominal synchronization ratio corresponding to the nominal cutting angle aimed at,
    then a trailing phase in which the synchronization law further reduces the synchronization ratio in such a manner as, on approaching the second edge and when crossing said second edge forming a trailing edge, to apply a trailing synchronization ratio that is strictly less than the nominal synchronization ratio.

5. The cutting system according to claim 1, wherein the first blade covers an axial distance along the first rotation axis of the first cutting roller that is strictly greater than the width of the continuous strip so as to provide on the one hand, projecting from the first edge along said first rotation axis, an upstream lateral clearance that enables the variable synchronizer controller to bring the rotation speed of the first cutting roller to a required value, corresponding to the required synchronization ratio, before the first blade comes into contact with the continuous strip at a level of the first edge of said continuous strip and on another hand, projecting from the second edge along said first rotation axis, a downstream lateral clearance enabling the first rotation to continue beyond the second edge and therefore the routing of the first blade that corresponds to the cutting action exerted by said first blade to continue beyond the second edge so that the synchronization ratio remains controllable at least up to the time at which a strip is detached completely from the continuous strip.

6. The cutting system according to claim 1, wherein at least one of the first and second cutting roller comprises a guide shoulder that is arranged to form a lateral stop against the first edge or the second edge.

7. The cutting system according to claim 6, wherein the second cutting roller comprises the guide shoulder and the cylindrical bearing surface.

8. The cutting system according to claim 1, wherein the cutting system is intended to cut continuous strips comprising reinforcing cords that are continuous and arranged parallel to the first and second edges with a predetermined pitch and wherein at least one of the first and second cutting roller(s) comprises a cylindrical bearing surface centered on the rotation axis of said cutting roller on which the continuous strip comes to bear, and that includes a series of annular grooves oriented in the longitudinal direction of the continuous strip, and the axial distribution pitch of which corresponds to the pitch of the reinforcing cords, so that said grooves contribute to lateral retention of the continuous strip during the cutting operation.

9. The cutting system according to claim 1, wherein the cutting system is intended to cut continuous strips comprising continuous reinforcing cords arranged parallel to the first and second edges with a predetermined pitch and wherein the first blade comprises striations oriented in the longitudinal direction of the continuous strip so that said striations contribute to lateral retention of the continuous strip during the cutting operation.

10. The cutting system according to claim 9, wherein said striations are spaced at an axial distribution pitch that corresponds to the pitch of the reinforcing cords.

11. The cutting system according to claim 1, wherein the second cutting roller features a helical groove of conjugate shape to the first blade.

12. The cutting system according to claim 1, wherein the first blade covers less than one helical pitch around the first cutting roller in such a manner that said first cutting roller features, in azimuth around the first rotation axis, on the one hand a cutting angular sector occupied by the first blade and on another hand a free passage angular sector (S20_free) where there is no blade and that is arranged to allow the continuous strip to move between the first and second cutting rollers without subjecting said continuous strip to any cutting action.

13. The cutting system according to claim 12, wherein the free passage angular sector comprises a flat that places the surface of the first cutting roller set back from the strip path.

14. An installation for producing reinforcement plies for tires, in particular for pneumatic tires, said installation comprising on the one hand a strip preparation device that produces strips by cutting said strips by means of the cutting system according to claim 1 in a continuous strip, the continuous strip is a zero degree belt that is formed of at least one layer of rubber layer reinforced by a plurality of reinforcing cords that are continuous that extend parallel to one another in the longitudinal direction of the continuous strip and on another hand an applicator head arranged to come to press said strips successively onto an assembly support, such as a conveyor, a cylindrical drum or a toroidal core, and to abut said strips successively one to the others by their edges so as to constitute a reinforcement ply.

15. The installation according to claim 14, wherein the applicator head comprises a presser member such as a presser roller arranged to come to press the strip against the assembly support and wherein the cutting system is arranged to cut the strip on the fly while said strip is already engaged on the assembly support and being applied onto said assembly support at a non-zero speed that corresponds to the forward speed at which the continuous strip travels the strip path between the first and second cutting rollers.

16. A method of producing strips during which successive strips are produced by cutting a continuous strip, the continuous strip extends lengthwise in a longitudinal direction and widthwise between a first edge and a second edge,
by feeding with at least one electric motor said continuous strip at a forward speed that is oriented in the longitudinal direction of said continuous strip along a strip path that passes between a first cutting roller provided with a first helical blade, and a contrarotating second cutting roller,
by driving with the at least one electric motor said first cutting roller in a first movement in rotation at a chosen rotation speed around a first rotation axis oriented transversely to the strip path so as to travel and to cut all the width of said continuous strip from the first edge to the second edge,
by controlling the at least one electric motor with a variable synchronizer controller, setting the forward speed conferred on the continuous strip and the rotation speed of the first cutting roller in such a manner as to select and to modify a synchronization ratio between the rotation speed of the first cutting roller and the forward speed of the continuous strip in such a manner as to adjust a cutting angle at which the cutting of the continuous strip is oriented relative to the longitudinal direction of said continuous strip, and
wherein during a single cut, the variable synchronizer controller employs at least one synchronization law that dynamically modifies the synchronization ratio while the first blade is engaged on the continuous strip, between the first edge and the second edge, so as successively to a plurality of synchronization ratios with different values.

17. The cutting system according to claim 1, wherein the second rotation axis is parallel to the first rotation axis.

18. The cutting system according to claim 1, wherein the first rotation axis is oriented perpendicularly to said strip path.

19. The method according to claim 16, wherein the strip is cut along an actual cutting line that is rectilinear and oriented at a nominal cutting angle relative to the longitudinal direction of the continuous strip to which geometrically corresponds to a nominal synchronization ratio by successively applying: a leading synchronization ratio the absolute value of which is strictly greater than the absolute value of the nominal synchronization ratio to engage and to cross the first edge, then a second synchronization ratio lower than the first synchronization ratio and equal to the nominal synchronization ratio, then, on approaching the second edge and when crossing said second edge, a trailing synchronization ratio the absolute value of which is strictly less than the absolute value of the nominal synchronization ratio.

* * * * *